(12) United States Patent　　(10) Patent No.: US 9,230,524 B2
Cortina　　(45) Date of Patent: Jan. 5, 2016

(54) SECURE GUITAR STANDS AND RACKS THEREFOR

(71) Applicant: Esteban Cortina, Santa Barbara, CA (US)

(72) Inventor: Esteban Cortina, Santa Barbara, CA (US)

( * ) Notice: Subject to any disclaimer, the term of this patent is extended or adjusted under 35 U.S.C. 154(b) by 0 days.

(21) Appl. No.: 14/536,372

(22) Filed: Nov. 7, 2014

(65) Prior Publication Data

US 2015/0129523 A1　　May 14, 2015

Related U.S. Application Data

(60) Provisional application No. 61/902,727, filed on Nov. 11, 2013.

(51) Int. Cl.
| | | |
|---|---|---|
| *A47F 7/00* | (2006.01) |
| *G10G 5/00* | (2006.01) |
| *F16M 11/04* | (2006.01) |
| *F16B 2/10* | (2006.01) |

(52) U.S. Cl.
CPC .. *G10G 5/00* (2013.01); *F16B 2/10* (2013.01); *F16M 11/041* (2013.01)

(58) Field of Classification Search
CPC .......................................................... G10G 5/00
USPC ...................... 211/85.6, 20; 84/327, 329, 421; 248/443
See application file for complete search history.

(56) References Cited

U.S. PATENT DOCUMENTS

| | | | | |
|---|---|---|---|---|
| 1,886,549 | A * | 11/1932 | Howell et al. | 211/20 |
| 2,058,184 | A * | 10/1936 | Sherrard | 211/85.6 |
| 4,036,462 | A * | 7/1977 | Sheftel | 248/166 |
| 4,352,480 | A * | 10/1982 | Gathright | 248/448 |
| 4,371,082 | A * | 2/1983 | Hostert et al. | 211/22 |
| 4,693,161 | A * | 9/1987 | Uhrig | 84/327 |
| 4,986,158 | A * | 1/1991 | Johnson | 84/327 |
| 5,121,890 | A * | 6/1992 | Komada | 248/122.1 |
| 5,149,901 | A * | 9/1992 | Boor et al. | 84/327 |
| 5,375,497 | A * | 12/1994 | Pirchio et al. | 84/327 |
| 5,467,953 | A * | 11/1995 | Malizia | 248/166 |
| 5,505,413 | A * | 4/1996 | Hennessey | 248/166 |
| 5,735,410 | A * | 4/1998 | Kallstrom | 211/20 |
| 5,744,735 | A * | 4/1998 | Liao | 84/327 |
| 5,836,552 | A * | 11/1998 | Yu | 248/166 |
| 5,959,225 | A * | 9/1999 | Hsu | 84/327 |
| 5,984,245 | A * | 11/1999 | Hsu | 248/164 |
| 6,036,159 | A * | 3/2000 | Yu | 248/443 |
| 6,127,612 | A * | 10/2000 | Yu | 84/327 |
| 6,323,406 | B1 * | 11/2001 | Park | 84/327 |
| 6,326,531 | B1 * | 12/2001 | Bremner | 84/327 |
| 6,563,035 | B2 * | 5/2003 | Hsieh | 84/327 |
| 6,722,617 | B2 * | 4/2004 | Wilfer | 248/163.1 |

(Continued)

*Primary Examiner* — Joshua Rodden
*Assistant Examiner* — Kimberley S Wright
(74) *Attorney, Agent, or Firm* — Guy Cumberbatch

(57) ABSTRACT

A stand for securely and gently cradling a stringed instrument such as a guitar. The stand includes a pair of cradling arms and at least one support member both mounted for movement relative to a base member. A user places the guitar on the generally horizontally oriented support member depressing it downward which causes movement of the cradling arms from an outward open position to an inward closed position latterly supporting the body of the stringed instrument. Movement of the two cradling arms is coordinated by providing a single support member or by attaching to support members to a common yoke mounted for vertical movement on the base member. Each stand can be mounted on a separate stabilizing platform, or a plurality of stands can be mounted to adapters along a storage rack.

20 Claims, 22 Drawing Sheets

(56) References Cited

U.S. PATENT DOCUMENTS

| | | | |
|---|---|---|---|
| 6,800,798 B2* | 10/2004 | Hsieh | 84/327 |
| 7,074,993 B1* | 7/2006 | Hsieh | 84/327 |
| D538,554 S * | 3/2007 | Tai | D6/466 |
| 7,368,647 B2* | 5/2008 | Hsieh | 84/327 |
| 7,394,006 B2* | 7/2008 | Bordignon | 84/327 |
| 7,514,616 B2* | 4/2009 | Sawhney | 84/327 |
| 7,777,110 B2* | 8/2010 | Wallis | 84/327 |
| 7,932,451 B2* | 4/2011 | Workman et al. | 84/327 |
| 8,367,919 B2* | 2/2013 | Belitz et al. | 84/453 |
| 8,490,942 B1* | 7/2013 | Henry | 248/441.1 |
| 8,770,535 B1* | 7/2014 | Yu | 248/443 |
| 8,925,890 B2* | 1/2015 | Liaw | 248/443 |
| 8,967,585 B2* | 3/2015 | Furuta et al. | 248/443 |
| 2004/0016856 A1* | 1/2004 | Wilfer | 248/163.1 |
| 2004/0060878 A1* | 4/2004 | Ho | 211/17 |
| 2004/0144233 A1* | 7/2004 | Hsieh | 84/327 |
| 2005/0016354 A1* | 1/2005 | Kent | 84/327 |
| 2006/0016952 A1* | 1/2006 | Workman | 248/443 |
| 2006/0144210 A1* | 7/2006 | Hsieh | 84/327 |
| 2006/0185495 A1* | 8/2006 | Hsieh | 84/327 |
| 2007/0068362 A1* | 3/2007 | Bordignon | 84/327 |
| 2007/0131091 A1* | 6/2007 | Hsieh | 84/423 R |
| 2008/0028912 A1* | 2/2008 | Sawhney | 84/327 |
| 2008/0135697 A1* | 6/2008 | Workman et al. | 248/177.1 |
| 2009/0277320 A1* | 11/2009 | Wallis | 84/327 |
| 2011/0154975 A1* | 6/2011 | Belitz et al. | 84/423 R |
| 2011/0303804 A1* | 12/2011 | Rodrigues | 248/122.1 |
| 2013/0048804 A1* | 2/2013 | Furuta et al. | 248/168 |
| 2013/0055876 A1* | 3/2013 | Mason | 84/298 |
| 2013/0149024 A1* | 6/2013 | Belitz et al. | 403/109.1 |
| 2013/0206932 A1* | 8/2013 | Henry | 248/121 |
| 2014/0117173 A1* | 5/2014 | Liaw | 248/125.8 |
| 2014/0151527 A1* | 6/2014 | Sawhney et al. | 248/542 |
| 2014/0203158 A1* | 7/2014 | Hennessey | 248/439 |
| 2014/0224948 A1* | 8/2014 | McEwan | 248/163.1 |

* cited by examiner

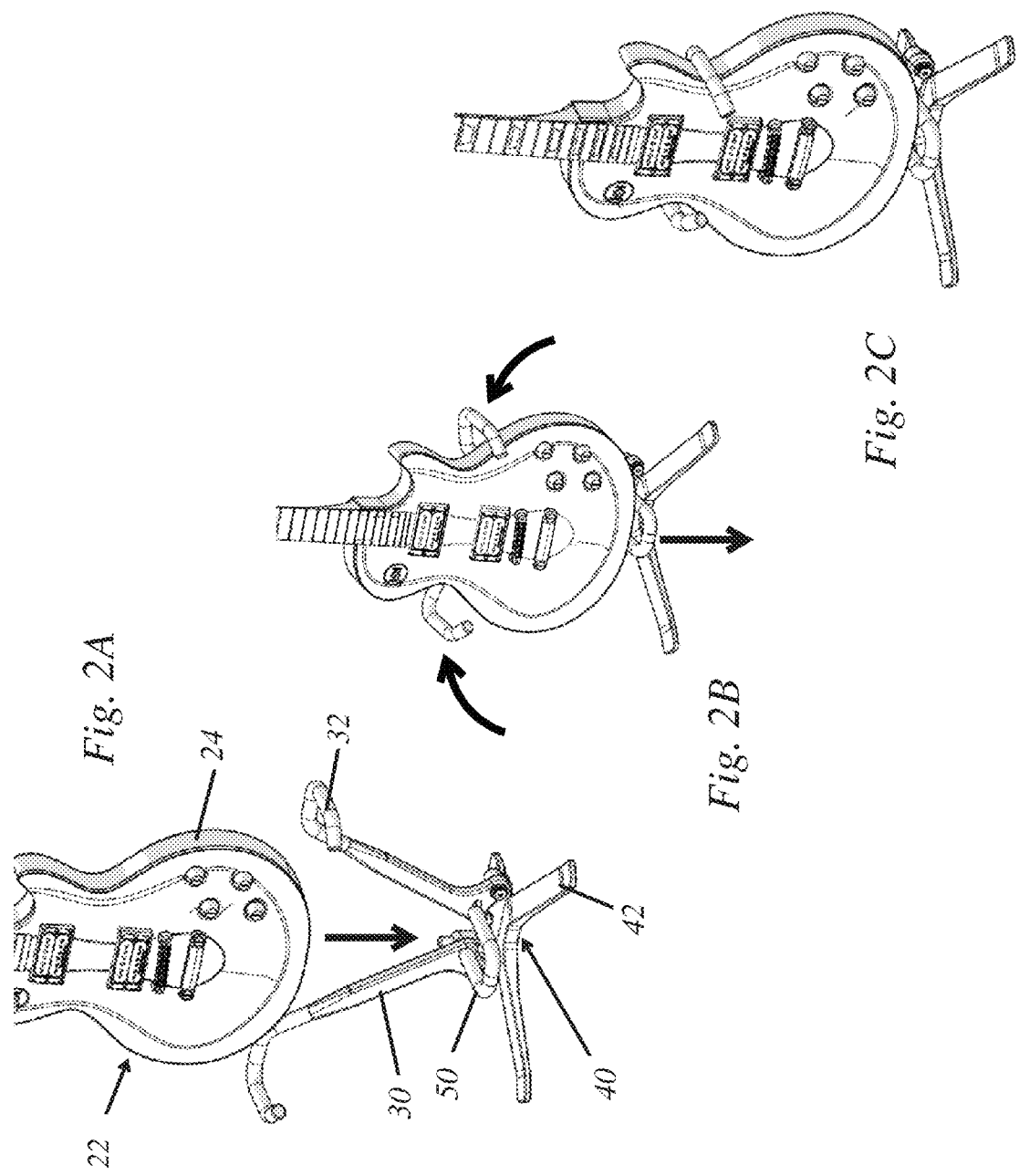

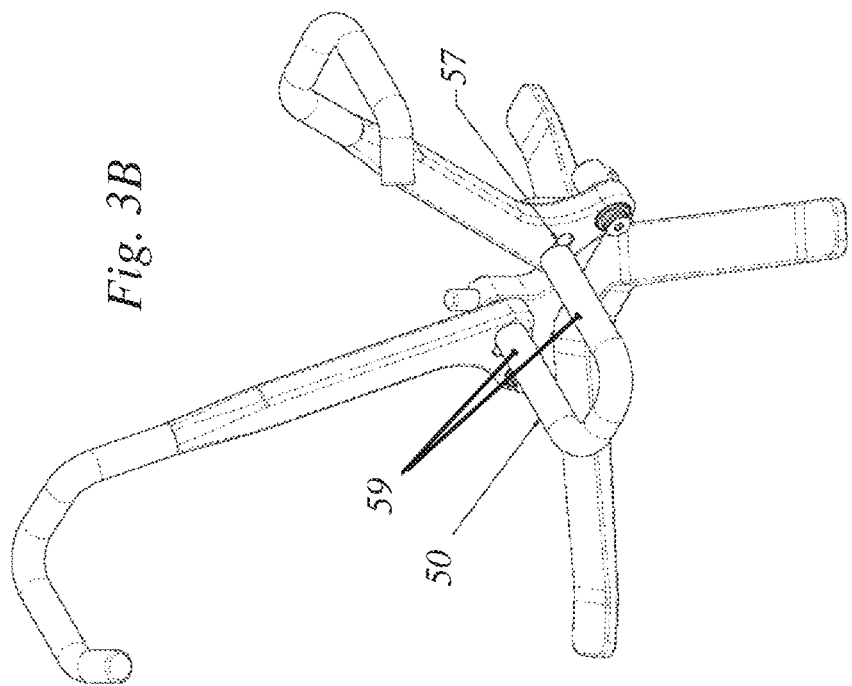
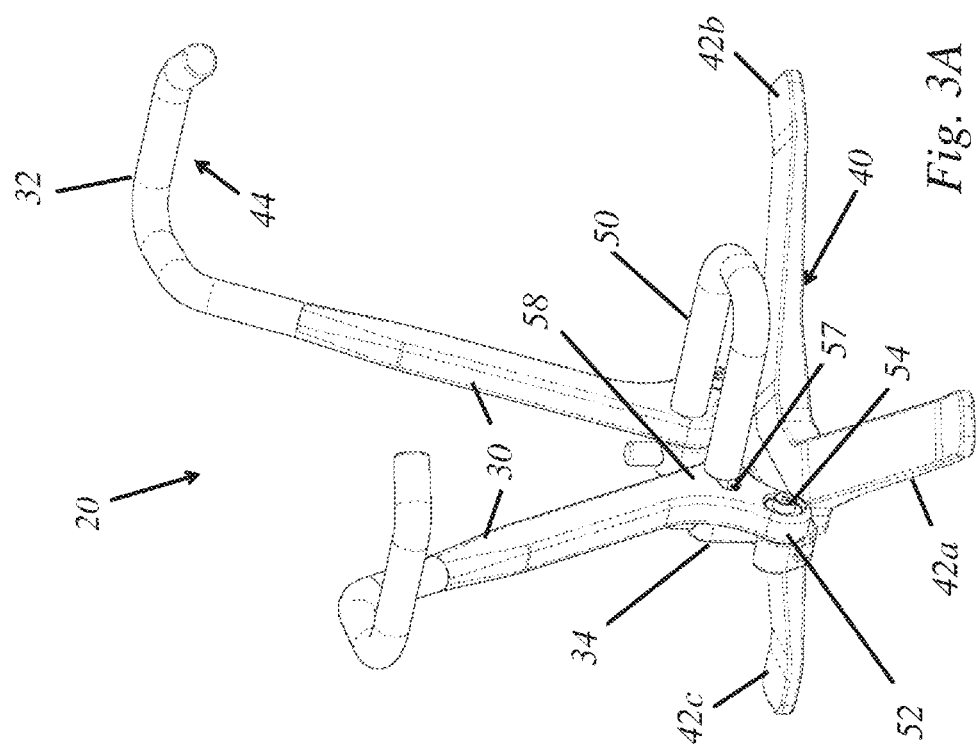

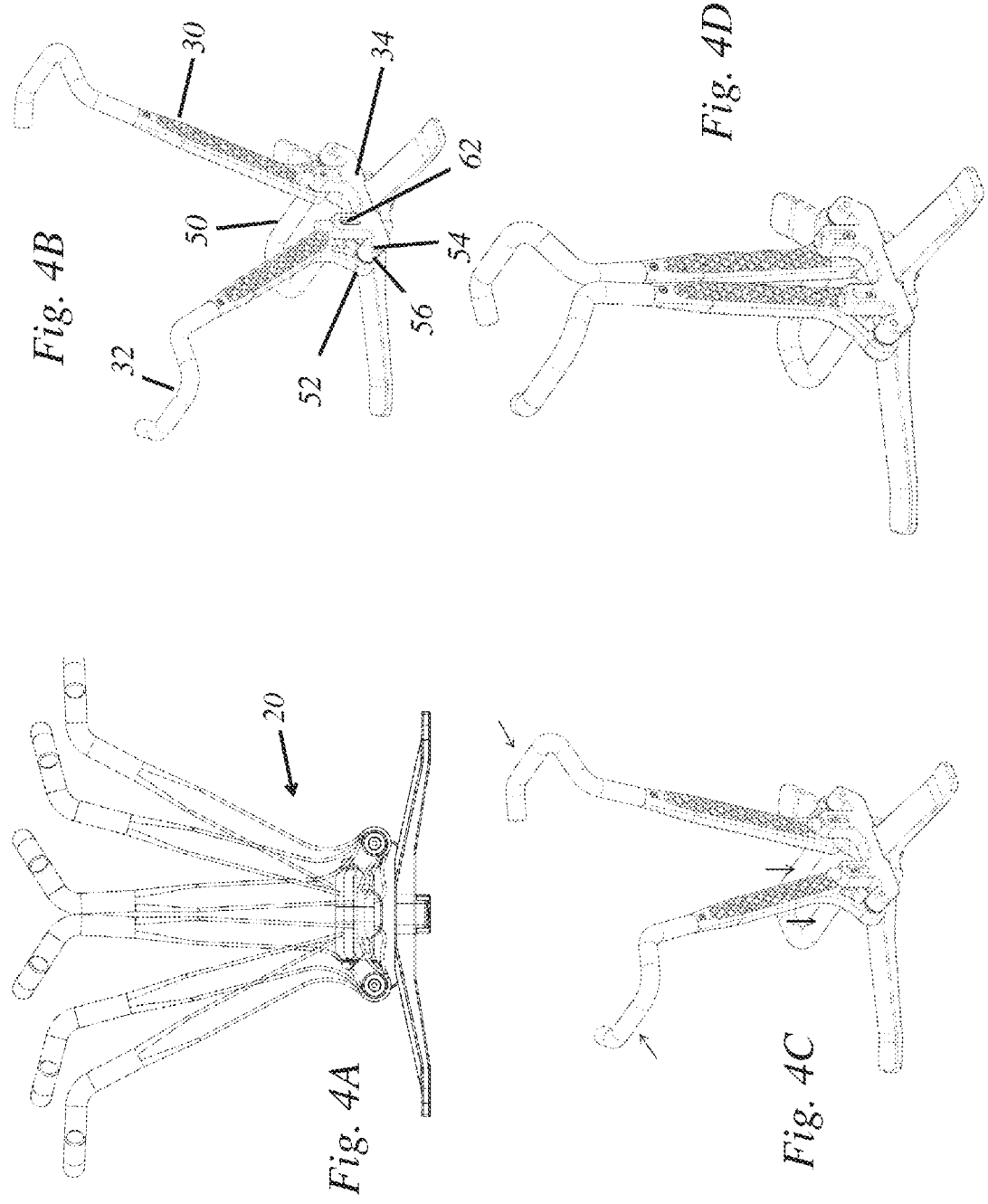

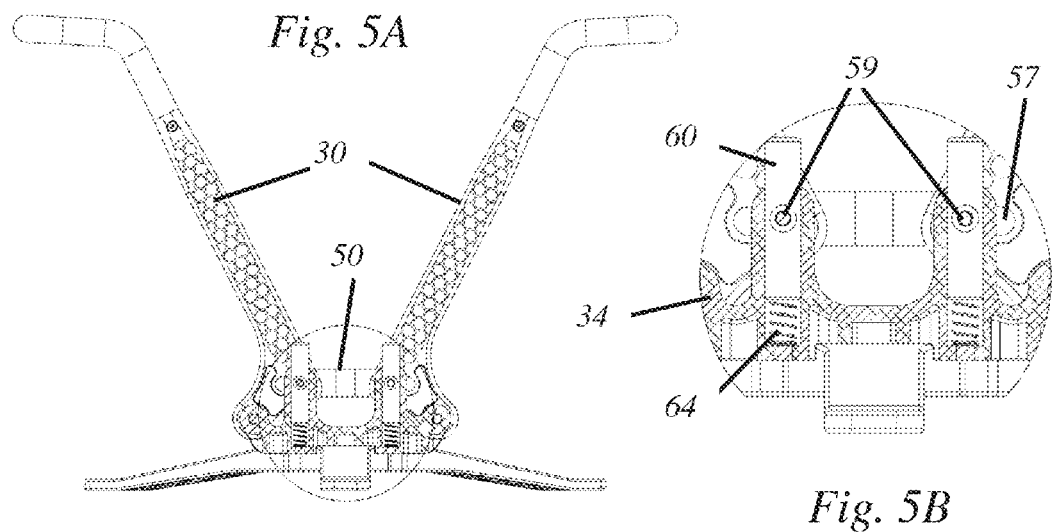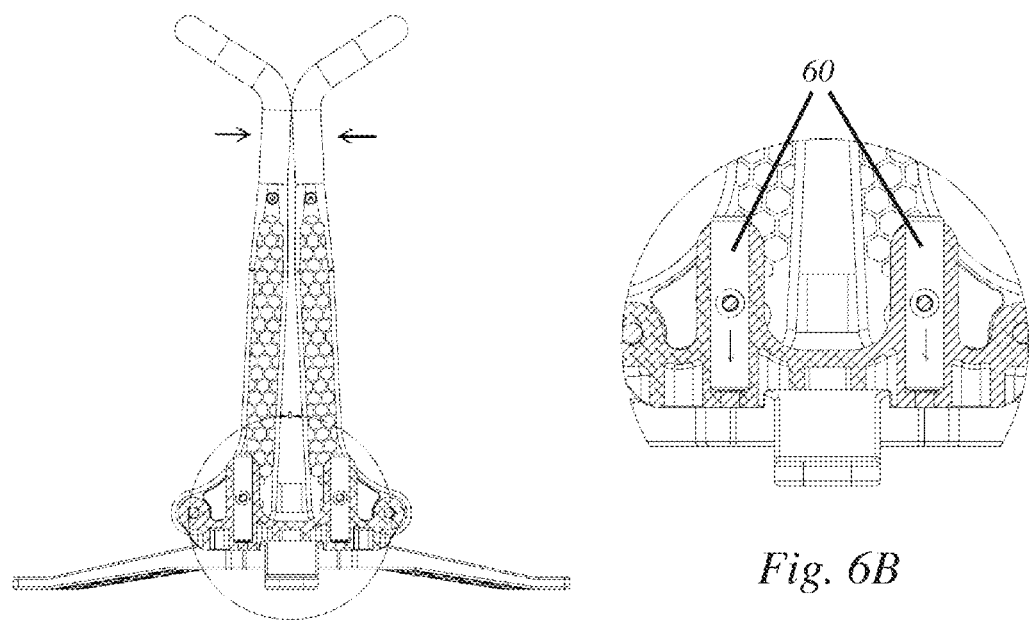

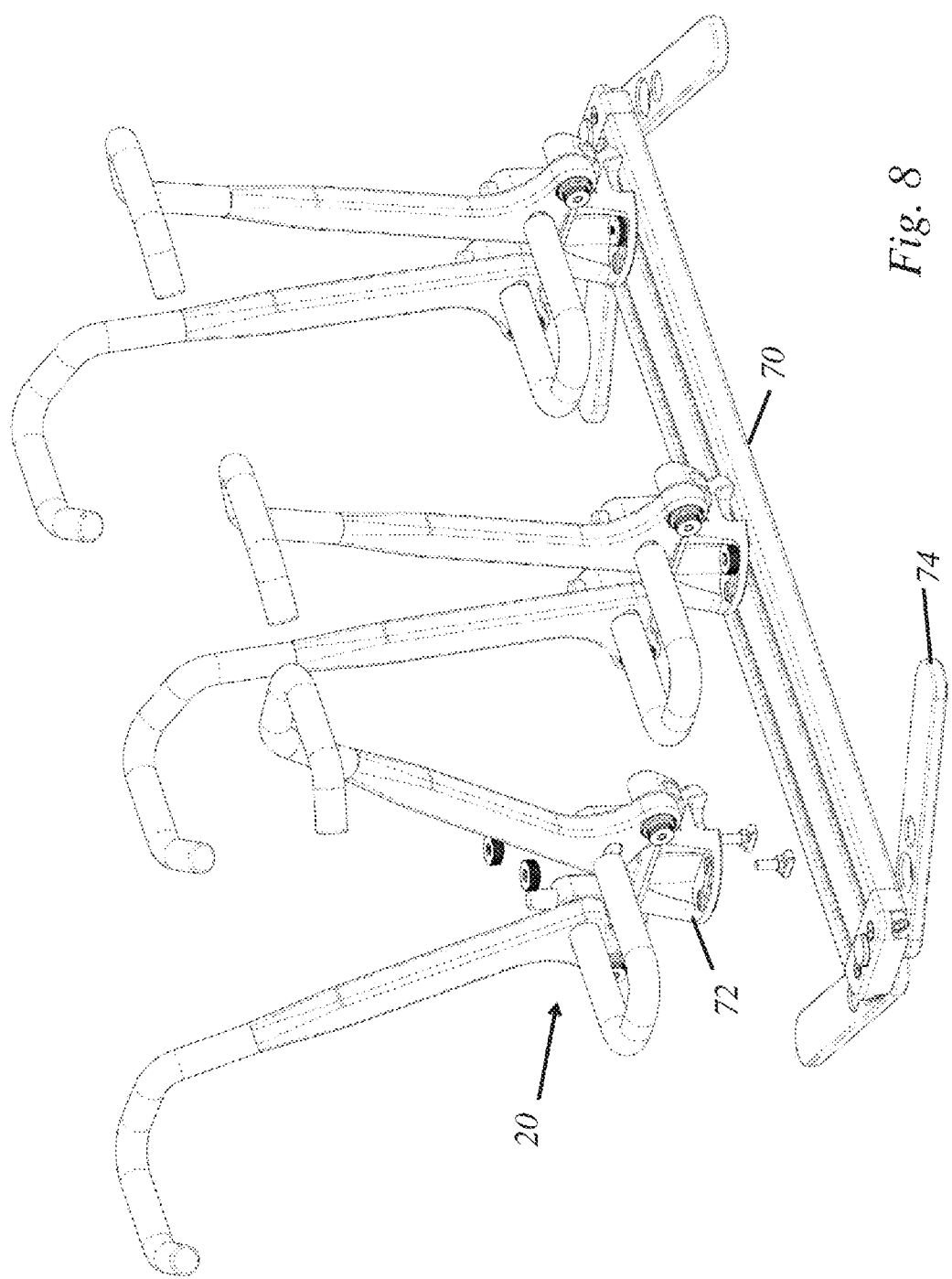

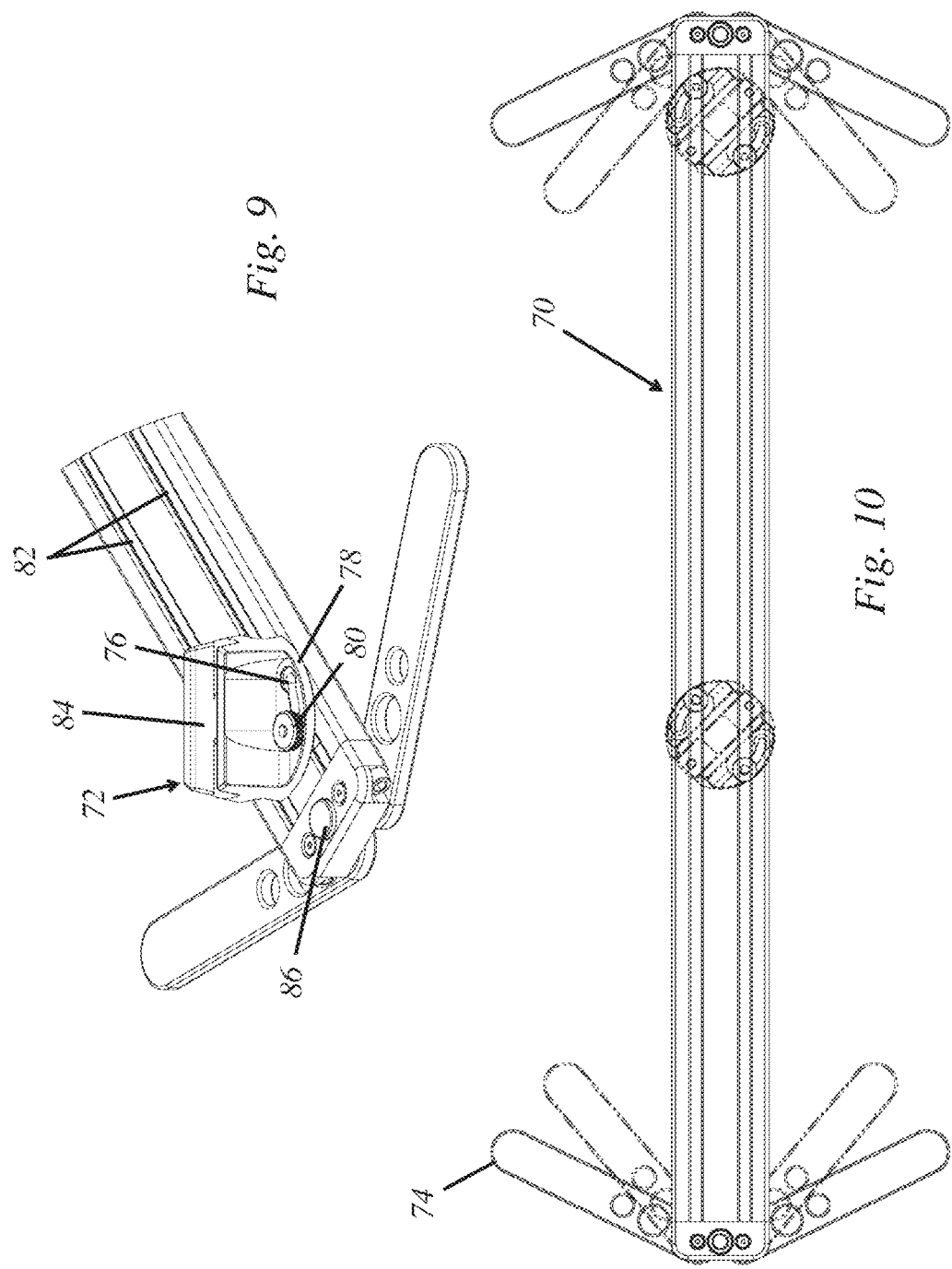

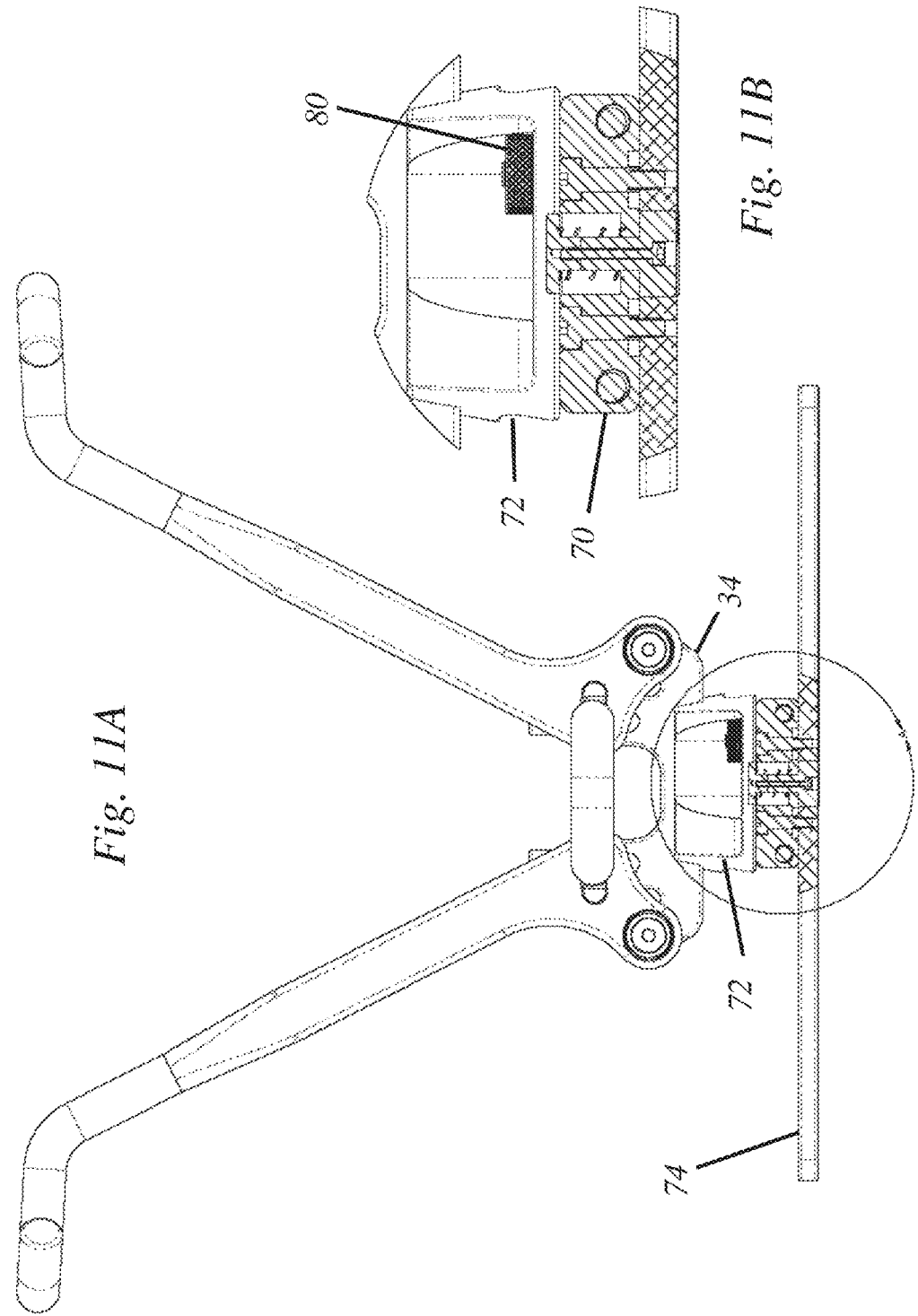

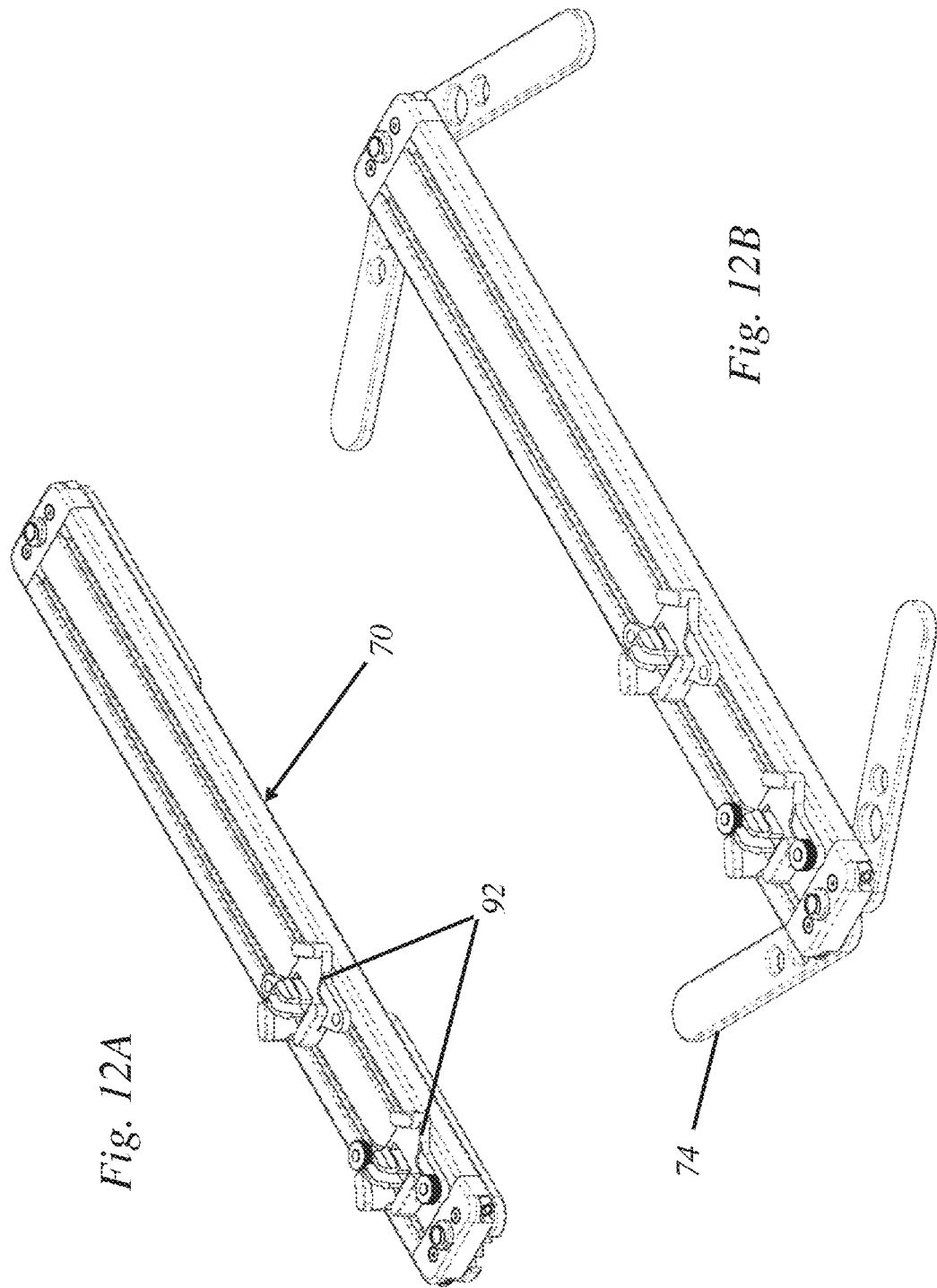

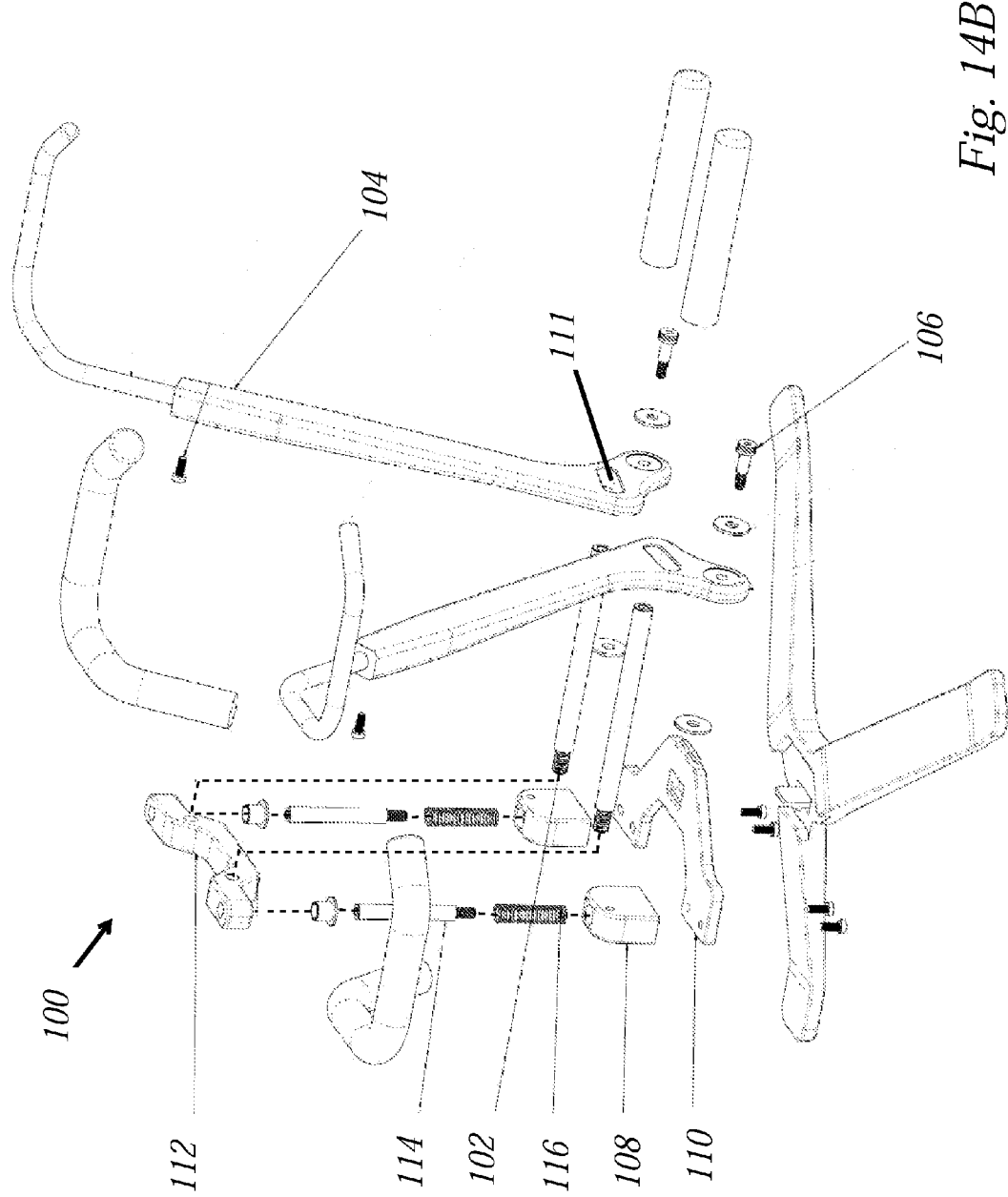

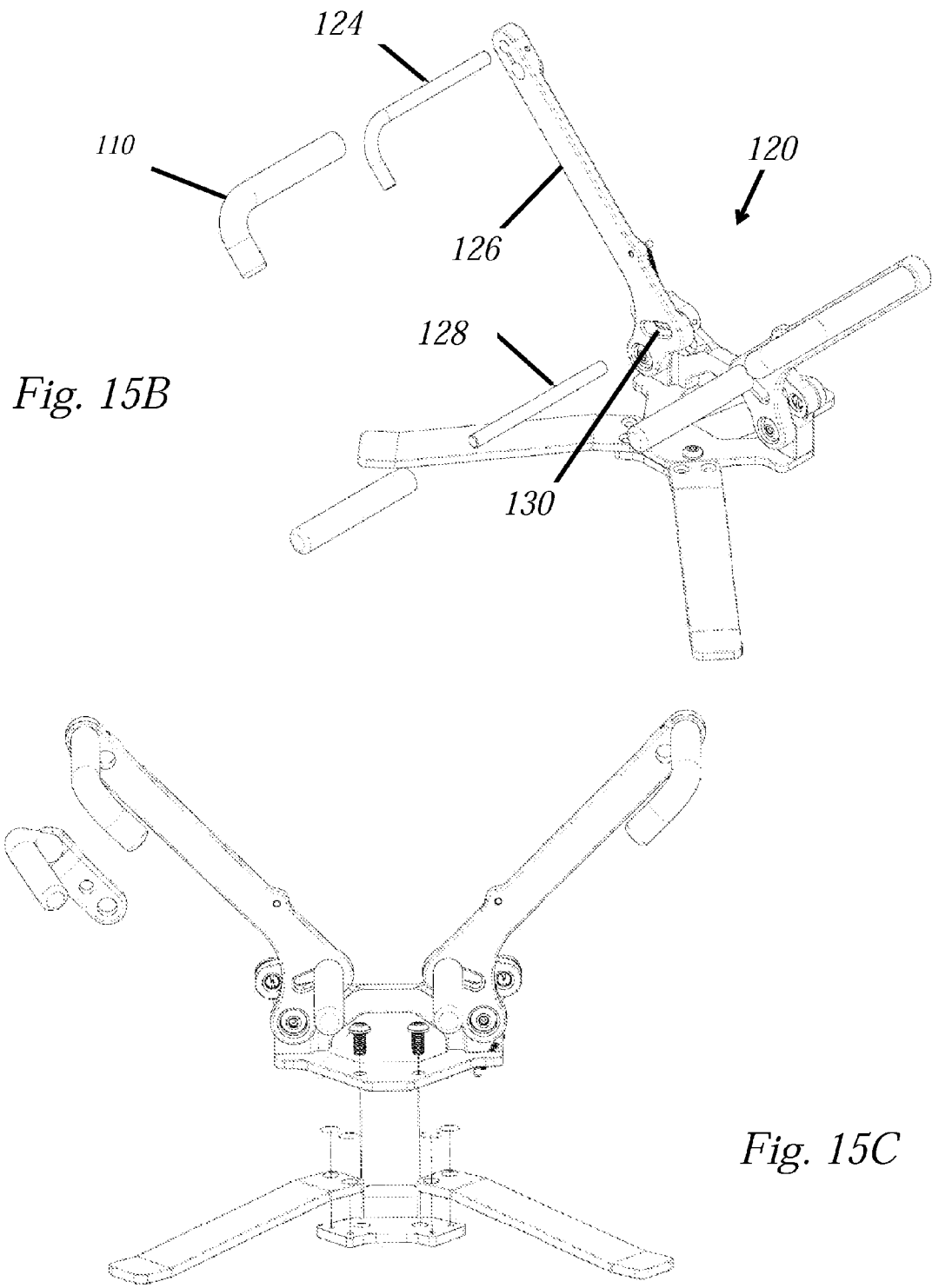

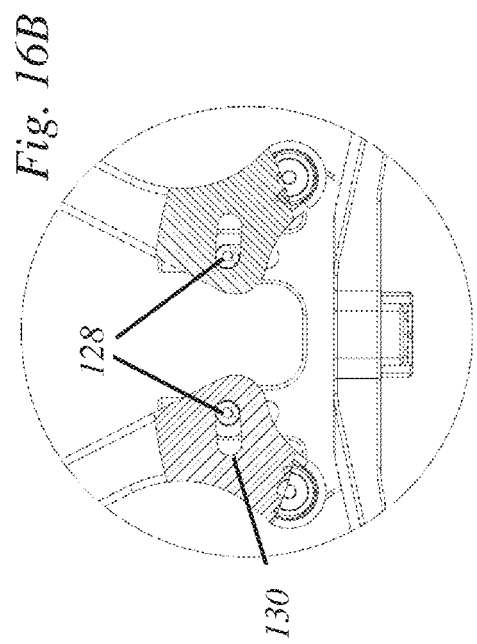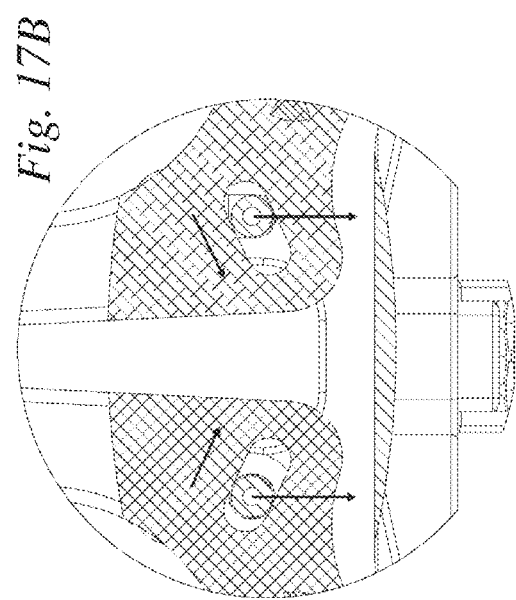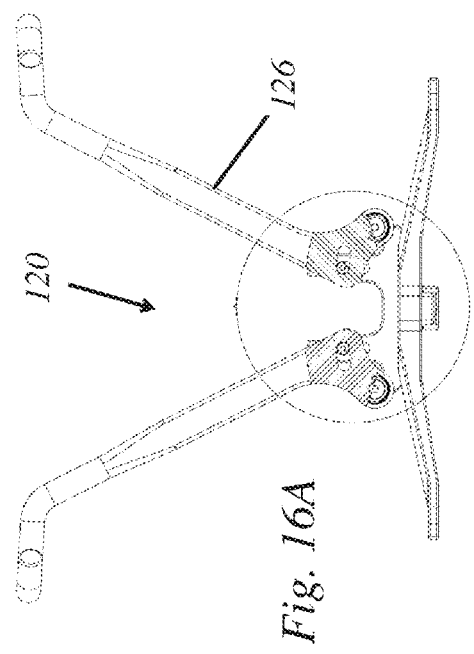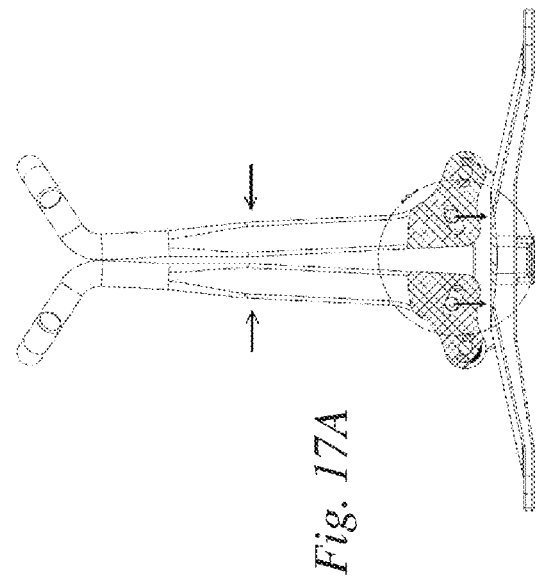

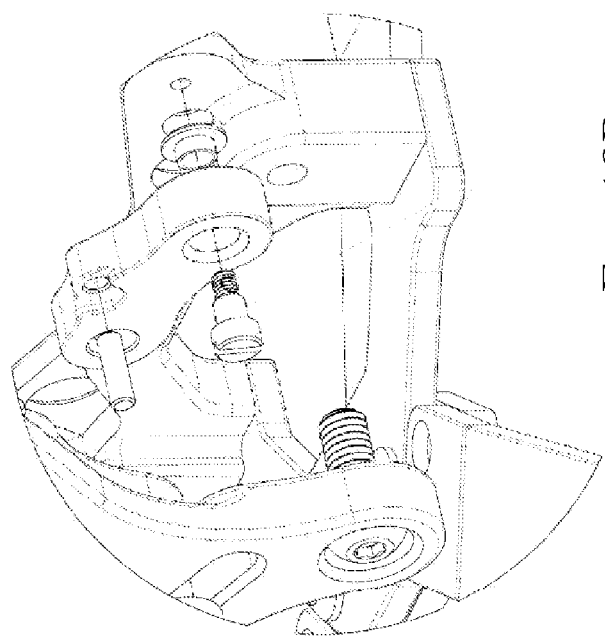
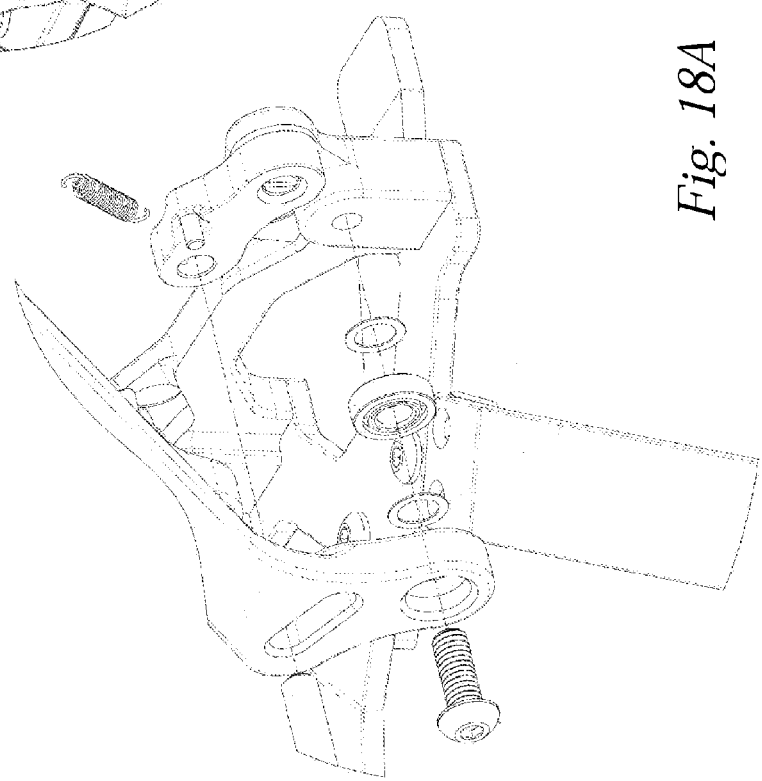
Fig. 18B
Fig. 18A

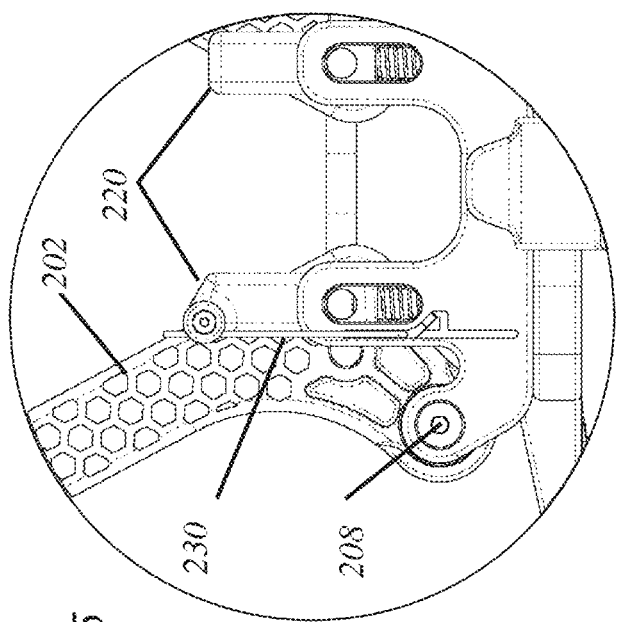
Fig. 25
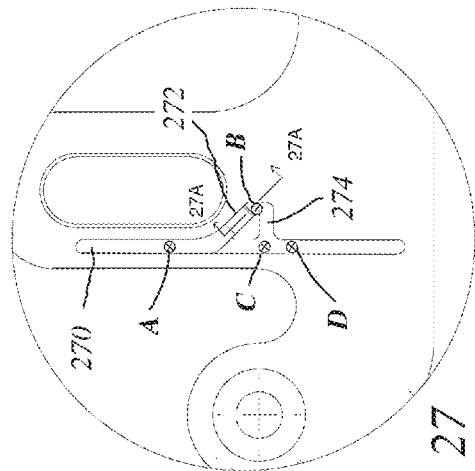
Fig. 27
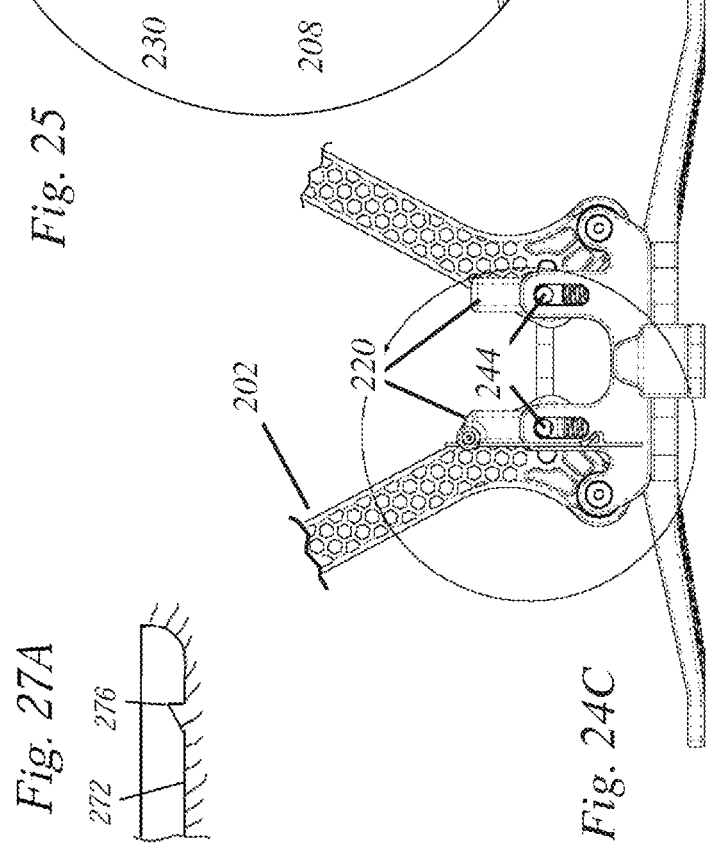
Fig. 24C
Fig. 26
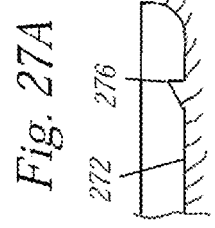
Fig. 27A

SECURE GUITAR STANDS AND RACKS THEREFOR

RELATED APPLICATIONS

The present application claims priority under 35 U.S.C. §119(e) to U.S. Provisional Application No. 61/902,727, filed Nov. 11, 2013, the contents of which are expressly incorporated herein by reference.

FIELD OF THE INVENTION

The present invention relates to a guitar stand having movable arms to cradle the guitar, and racks therefor.

BACKGROUND OF THE INVENTION

Musical instruments are particularly sensitive to external mechanical effects. Even a slight contact with the tuning mechanism of a guitar or of a string instrument can adversely affect the tonal qualities of the instrument. Musical instruments must be set aside in such a manner, that their sensitive components are not exposed to contact with the floor, the wall or passers-by.

There are numerous stands available for holding or otherwise accommodating musical instruments having a narrow end and a wide end such as, for example, guitars, bass guitars, and similar string type instruments. In some stands, the guitar essentially "hangs" from its headpiece, which can damage the instrument by putting stress on the angle between the headpiece and the neck.

Other stands attempt to be more careful with the guitar by supporting the body while simply corralling the neck. For example, U.S. Pat. No. 5,375,497 discloses a stand for elongate instruments, in particular guitars. The stand comprises a base and a generally vertical main section. The base is provided for set-up of the stand on a generally flat surface. The vertical main section has, in its lower portion, a support assembly for the guitar body. At the upper end of the vertical main section, a C or U shaped yoke is provided for the accommodation of the guitar neck. However, there is still the possibility of the guitar neck coming loose and the guitar falling from the stand. This is problematic for any guitar, but in particular for extremely sophisticated and expensive guitars and other stringed instruments.

Despite the wide variety of guitar stands that prevent the guitar from toppling over, there remains a need for one that cradles the guitar in a more secure and gentle manner.

SUMMARY OF THE INVENTION

A stand for safely and gently cradling a stringed instrument such as a guitar. The stand includes a pair of cradling arms and at least one support member both mounted for movement relative to a base member. A user places the guitar on the generally horizontally oriented support member depressing it downward which causes movement of the cradling arms from an outward open position to an inward closed position laterally supporting the body of the stringed instrument. Movement of the two cradling arms is coordinated by providing a single support member or by attaching to support members to a common yoke mounted for vertical movement on the base member. Each stand can be mounted on a separate stabilizing platform, or a plurality of stands can be mounted to adapters along a storage rack.

In accordance with a preferred embodiment, a stand for securing a stringed musical instrument having a lower body and an upstanding neck comprises a base member, a pair of cradling arms mounted to the base member, and a lower support member for the stringed musical instrument. The cradling arms mount to the base member in a manner that allows pivoting movement generally in a vertical plane relative to the base member. The arms extend upward from the base member and angle away from one another in an open position. The arms each having a pair of cradles that extend horizontally forward sufficiently far to cradle the body of the stringed musical instrument. The arms pivot inward toward each other and toward a closed position where the cradles contact the body of the stringed musical instrument and provide lateral support on either side thereof. The support member mounts to and extends horizontally forward from the base member and the stringed musical instrument rests thereon. The support member is adapted to move vertically relative to the base member and is coupled to one or both of the cradling arms and configured to cause the cradling arms to pivot from the open toward the closed position when the body of the stringed musical instrument is placed on the support member and displaces it downward.

In accordance with another aspect, a system for supporting one or more stringed instruments comprises a stringed musical instrument stand having a base member and a lower support member extending generally horizontally therefrom in a forward direction and on which a stringed musical instrument rests. The stand further includes at least one cradle for holding a lower body of the stringed musical instrument. A stabilizing platform to which the base member mounts has a plurality of outwardly splayed feet, such that mounting the base member on the stabilizing platform enables the stand to hold a single stringed musical instrument upright. An elongated storage rack has a plurality of mounting adapters that can be fastened thereto at various locations. Each mounting adapter includes structure to which the base member of the stand mounts when the stabilizing platform is detached from the base member. Consequently, a plurality of the stands may be mounted to corresponding mounting adapters and arrayed in sequence along the storage rack to hold a plurality of stringed musical instruments.

BRIEF DESCRIPTION OF THE DRAWINGS

Features and advantages of the present invention will become appreciated as the same become better understood with reference to the specification, claims, and appended drawings wherein:

FIGS. 2A-2C are front prospective views of a guitar being placed in the exemplary guitar stand showing automatic inward movement of cradling arms;

FIGS. 3A and 3B are two front perspective views of the exemplary guitar stand;

FIGS. 4A-4D are elevational and perspective views that further illustrate movement of the cradling arms of the guitar stand;

FIGS. 5A-5B and 6A-6B are cutaway rear elevational views of the guitar stand illustrating an exemplary mechanism for coupling the movement of the two cradling arms;

FIG. 8 is a perspective partially exploded view of multiple guitar stands showing details for mounting the stands on the collapsible storage rack;

FIG. 9 is an enlarged perspective view of an exemplary guitar stand mounting bracket on the collapsible storage rack as well as deployable stabilizing feet;

FIG. 10 is a top plan view of the collapsible storage rack showing different positions of the deployable stabilizing feet on either end;

FIGS. 11A and 11B are partial sectional views that illustrate details of how the guitar stand mounting brackets couples to the collapsible storage rack;

FIGS. 12A and 12B are perspective views of the collapsible storage rack before and after deployment of stabilizing feet, also illustrating alternative guitar stand mounting brackets;

FIGS. 14A-14B are assembled and exploded perspective views of an alternative guitar stand of the present application;

FIGS. 15A-15C are assembled and exploded perspective views of yet another alternative guitar stand of the present application;

FIGS. 16A-16B and 17A-17B are cutaway rear elevational views of the alternative guitar stand of FIGS. 14A-14B illustrating an exemplary mechanism for coupling the movement of the two cradling arms;

FIGS. 18A-18B are exploded perspective views of portions of the coupling mechanism of the alternative guitar stand of FIGS. 14A-14B;

FIGS. 24A-24C are perspective and elevational views, partly exploded, of the guitar stand of FIG. 22A illustrating components of an alternative mechanism for coupling the movement of the two cradling arms, and FIG. 25 is an enlargement of a portion of FIG. 24C; and FIG. 26 is an elevational of a base member used in the mechanism for coupling the movement of the two cradling arms, FIG. 27 is a detail thereof, and FIG. 27A shows a sectional view of one portion of a locking groove on the base member.

DETAILED DESCRIPTION OF THE PREFERRED EMBODIMENTS

The present invention pertains to support stands for musical instruments and racks therefore. The support stand of the present invention has been illustrated for a stringed musical instrument such as a guitar. However, other musical instruments having a neck or similar taper and a lower body, in particular stringed instruments such as bass guitars, ukuleles, banjos, violins, violas, cellos, can utilize the advantages of the present invention.

Figure 1C:
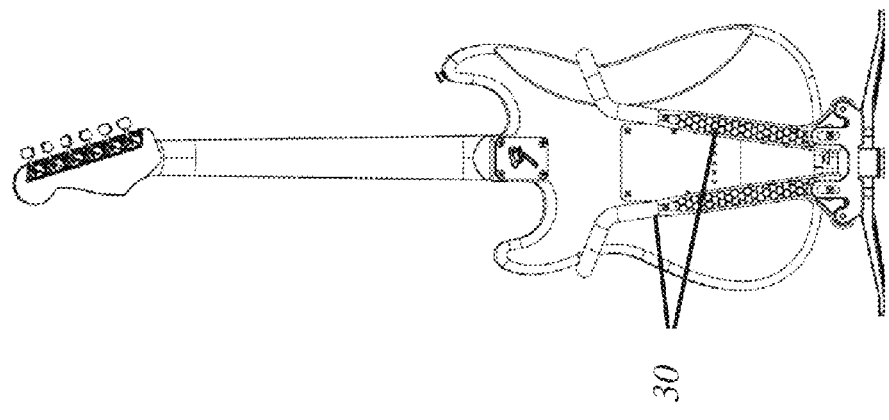
FIGS. 1A-1C are front, side, and rear elevational views of an exemplary guitar stand of the present application cradling a guitar.
Figure 1B:
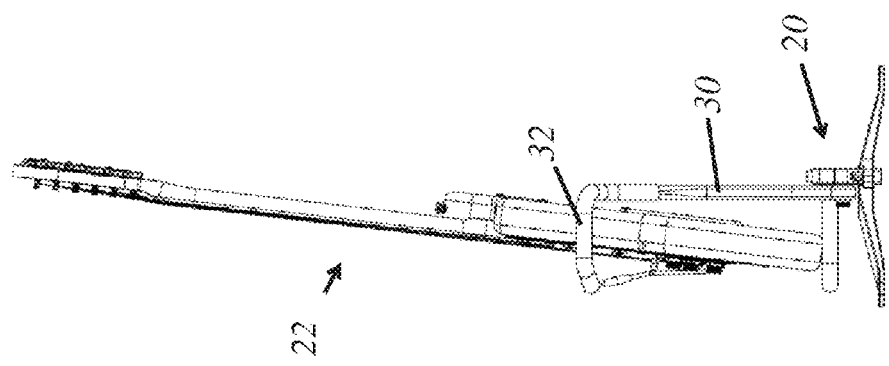
Figure 1A:
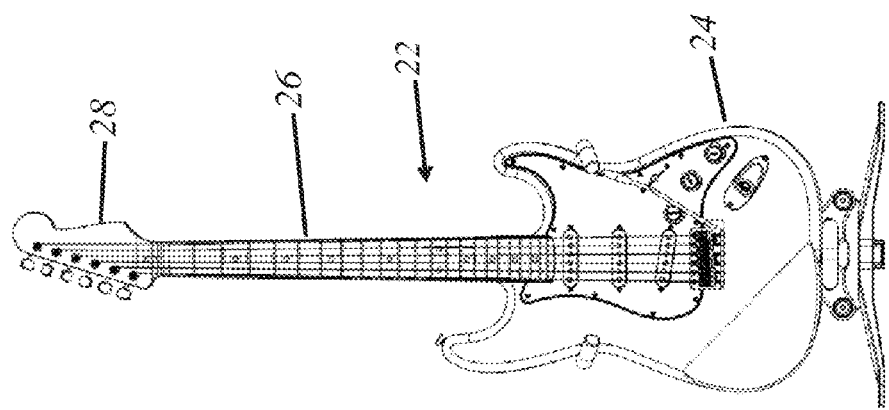

FIGS. 1A-1C are several views of an exemplary guitar stand 20 cradling a guitar 22. The guitar 22 includes a lower body 24, a neck 26 extending upward from the body, and a head 28 having a number of tuning posts around which the strings are wound. The guitar stand 20 features a pair of cradling arms 30 having cradles 32 on their upper ends which encompass and provide lateral support to the body 24 of the guitar 22.

With reference also to FIGS. 2A-2C and 3A-3B, the guitar stand 20 includes a lower yoke-shaped base member 34 to which the cradling arms 30 are pivotally mounted. In the illustrated embodiment, the base member 34 mounts to a stabilizing platform 40 including a plurality of outwardly splayed stabilizing feet 42. As will be explained below, the base member 34 may be detached from the platform 40 and reattached to an elongated rack which can support a plurality of the guitar stands 20. As such, the guitar stand 20 may be a standalone item, or may be arrayed with a plurality of other stands on a common rack.

As seen best in FIGS. 3A-3B and also FIGS. 4A-4D, the cradling arms 30 mount to the base member 34 in a manner that allows pivoting movement generally in a vertical plane relative to the base member. The cradling arms 30 extend upward from the base member 34 and angle away from one another in an open position, seen in FIGS. 3A-3B and 4B. The cradles 32 extend horizontally forward sufficiently far to cradle the body of the stringed musical instrument. In the illustrated embodiment, the cradles 32 comprise extensions of the arms 30 that are bent slightly outward and then inward again to provide a concave receiving area 44 on each side of the guitar body 24. In a preferred embodiment, the cradles 32 provide a soft exterior, such as by having padded sleeves, to further protect the body 24 of the guitar. The cradling arms 30 are able to pivot inward toward each other and a closed position shown in FIG. 4D. In the closed position, the cradles 32 contact and provide lateral support on either side of the guitar body 24, seen in FIGS. 1A-1C. It should be noted that the fully closed position in FIG. 4D is not the same as the position of the cradling arms 30 when a guitar 22 is present. Therefore, when the guitar 22 is placed in the stand 20 the arms 30 pivot inward toward the closed position until the cradles 32 contact the guitar body 24.

The guitar stand 20 further includes at least one guitar support member 50 that mounts to and extends horizontally forward from (i.e., is cantilevered forward from) the base member 34. The support member 50 provides a mounting platform for the guitar 22 and thus has sufficient structural strength to support the weight of the guitar 22. The support member 50 may have two struts as shown on which the guitar 22 rests, or a single strut may be adapted with a platform to provide adequate stability to the guitar 22 thereon. As will be seen, the support member 50 may mount and move relative to the base member 34 at two points, or could be modified such that only one mounting point is provided.

The guitar support member 50 is adapted to move vertically relative to the base member 34 and is coupled to one or both of the cradling arms 30. The guitar support member 50 causes the cradling arm(s) 30 to pivot from the open to the closed position when the guitar 22 is placed thereon and displaces it downward. This is seen in the sequence of FIGS. 2A-2C. First the user lowers the guitar body 24 onto the guitar support member 50. As the weight of the guitar 22 displaces the support member 50 downward, the cradling arms 30 are pivot inward such that the cradles 32 eventually encompass and provide lateral support on either side of the guitar body 24.

In the illustrated embodiment, the cradling arms 30 have a sufficient length such that the cradles 32 fit into concave areas on the sides of the guitar body 24, which is shown in the classic "hourglass" shape. Of course, guitars and other stringed instruments come in multiple sizes and shapes, and the length of the cradling arms 30 and configuration of the cradles 32 can be modified depending on the particular instrument. Once the cradling arms 30 are closed, as seen in FIG. 2C, the weight of the guitar 22 maintains the guitar support member in the down position which accordingly maintains the cradling arms 30 closed. Only by lifting up on the guitar 22 will the cradling arms 30 open.

With reference now to FIGS. 3A-3B, 4A-4D, and FIGS. 5A-5B and 6A-6B, an exemplary mechanism for coupling the movement of the two cradling arms 30 will be discussed. The cradling arms 30 broaden at their lower ends to have an outer finger 52 provided with a horizontal throughbore (not numbered) that receives a pivot shaft 54. The pivot shaft 54 extends horizontally rearward and through an outer flange 56 on the base member 34, best seen in FIG. 4C. The multiple position image of FIG. 4A illustrates an exemplary range of movement of the two cradling arms 30 as they pivot about the shafts 54 relative to the base member 34.

The lower end of each cradling arm 30 further includes a generally horizontal cam slot 57 provided in a heel region 58 opposite the finger 52, as best seen in FIGS. 3A and 5B (and at 130 in the alternative embodiment of FIG. 16B). In the exemplary embodiment, the guitar support member 50 comprises a U-shaped bracket with the closed end pointing forward and two free ends 59 extending rearward through the horizontal cam slots 57, as best seen in FIGS. 3A and 3B. Each free end 59 of the guitar support member 50 passes through the corresponding slot 57 and is secured to a guide shaft 60 movable within a vertical cavity 62 formed in the base member 34, as seen in FIGS. 4A-4D. Because the base member 34 is secured to either the stabilizing platform 40 or a multi-stand rack (described below), it provides a fixed frame of reference for the moving parts of the stand 20. Consequently, the guitar support member 50 is constrained by the vertical cavity 62 to up-and-down movement. The generally horizontal orientation of the cam slots 57 in each of the cradling arms 30 helps support the guitar support member 50 in its horizontal orientation (that is, prevents it from angling up or down).

Now with reference to the cutaway views of FIGS. 5A-5B and 6A-6B, the free ends 59 of the U-shaped support member 50 are each shown passing through the cylindrical guide shaft 60 positioned in a correspondingly shaped cavity 62 in the base member 34. The guide shafts 60 are biased upward by springs 64 positioned in the cavity, and thus the guitar support member 50 is also biased upward. When the support member 50 is in its uppermost position, contact between it and the generally horizontal cam slots 57 in the cradling arms 30 cause the cradling arms to pivot outward, as seen in FIGS. 5A-5B. Downward movement of the support member 50 from placing the guitar 22 thereon forces the guide shafts 60 downward against the bias of the springs 64. Contact between the free ends 59 of the support member 50 traveling through the cam slots 57 cause the cradling arms 30 to pivot inward, as seen in FIGS. 6A-6B.

In this manner, pivoting movement of the cradling arms 30 is coordinated by virtue of the common force is exerted thereon by the commonly moving support member 50. Furthermore, when enclosed by the cradling arms 30, the guitar 22 cannot shift laterally and push one of the cradling arms outward because of its connection via the support member 52 the other cradling arm. This provides an extremely secure means of holding the guitar 22. Furthermore, no part of the stand 20 grasps the neck 26 or head 28, only the body 24.

With reference again to FIGS. 3A-3B, the exemplary stabilizing platform 40 includes two outwardly splayed stabilizing feet 42a, 42b that project forward from the base member 34, and a single rearwardly-projecting foot 42c so as to provide a tripod support. The three feet 42a, 42b, 42c are arranged generally equidistantly at 120° spacing, with the front feet 42a, 42b being somewhat longer than the rear foot 42c. Each foot 42 has a vertical thickness that tapers down from an inner end toward the center of the platform 40 to outer ends. Furthermore, the center of the platform 40 is elevated slightly above the floor by virtue of the slightly angled feet 42. The outer ends of the feet 42 therefore are bent slightly so as to provide flat floor contact surfaces.

Figure 7C:
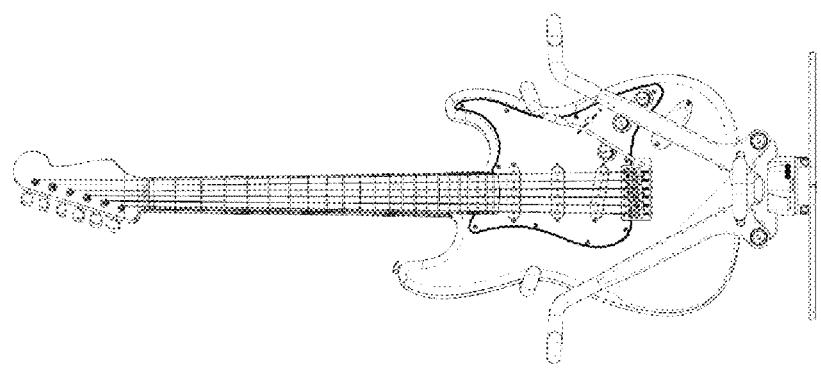
FIGS. 7A-7C are perspective and elevational views of multiple guitar stands holding guitars mounted on an exemplary collapsible storage rack.
Figure 7B:
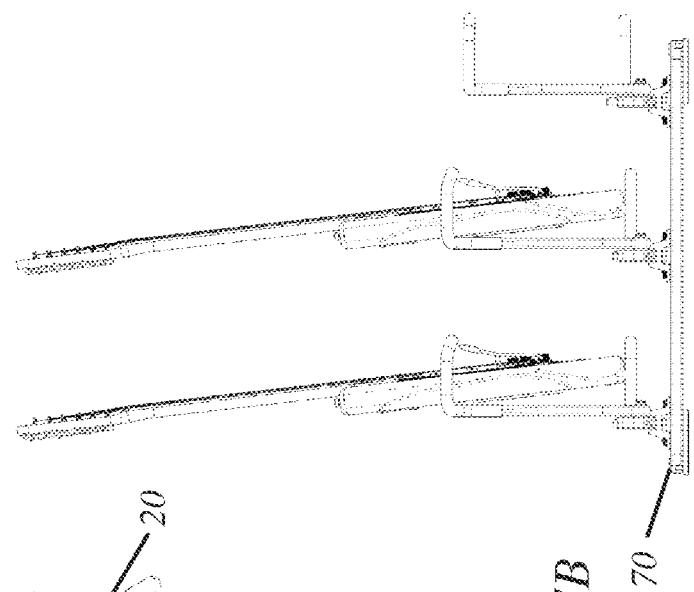
Figure 7A:
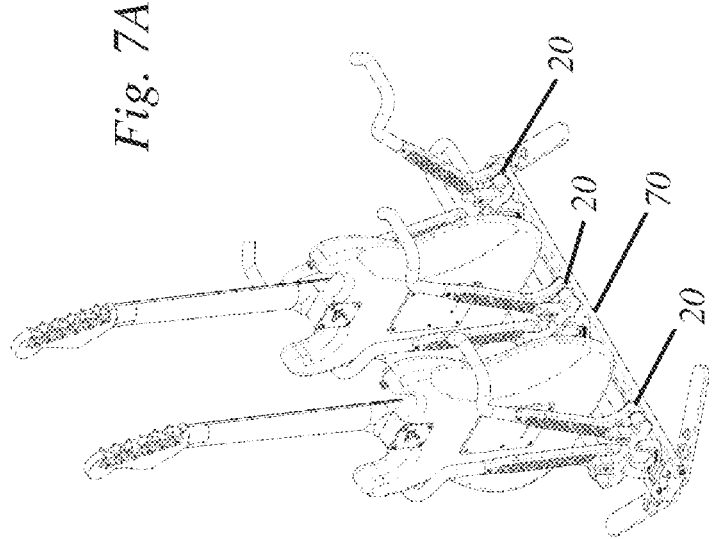

As mentioned above, the guitar stand 20 can be detached from the stabilizing platform 40 and re-attached to a multi-stand collapsible storage rack 70 shown in FIGS. 7A-7C. In the illustrated embodiment, the storage rack 70 has a sufficient length to mount three of the stands 20 in sequence for holding three guitars 22. Of course, a multi-stand storage rack 70 of the present application is one which can hold two or more guitar stands 20.

Now with reference to FIG. 8, the collapsible storage rack 70 shown with one of the stands 20 partly disassembled from it. FIG. 9 is an enlarged perspective view of an exemplary guitar stand mounting bracket 72 on the storage rack 70, while FIG. 10 is a top plan view of the storage rack showing different positions of stabilizing feet 74 on either end. The exemplary mounting bracket 72 has a rounded plan view shape with a pair of arcuate slots 76 provided in outwardly extending flanges 78. As seen in FIG. 9, and also in FIGS. 11A and 11B, fasteners 80 are used to secure the mounting bracket 72 to a pair of tracks 82 in the storage rack 70. Because of the arcuate shape of the slots 76, the mounting bracket 72 can be rotated to various orientations relative to the longitudinal direction of the rack 70. A central channel 84 in the mounting bracket 72 receives the lower end of the base member 34 of the guitar stand 20. Although not shown, clamps or fasteners are also provided to secure the base member 34 in the channel 84.

Figure 13:
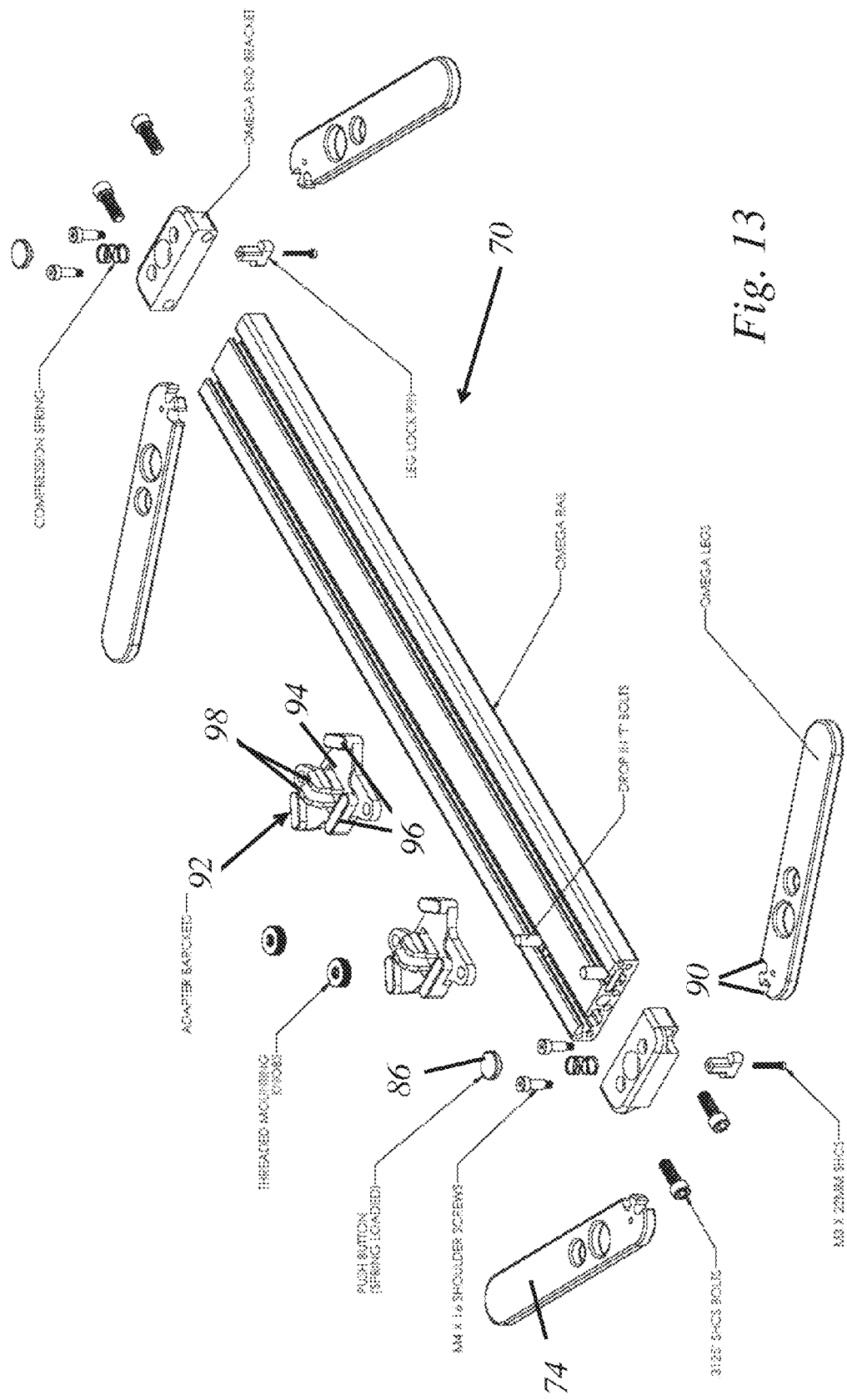
FIG. 13 is an exploded perspective view of the assembly in FIGS. 12A and 12B.

As seen in FIG. 10, and exploded view of FIG. 13, the stabilizing feet 74 rotate from collapsed positions under the storage rack 72 two horizontally outward positions providing lateral stability to the rack and the guitars 22 stored thereon. Preferably, a spring-biased button 86 at each end of the storage rack 70 releases the stabilizing feet 74 for movement. The inner ends of the stabilizing feet 74 include two cutouts 90 (see FIG. 13) that register with downwardly projecting pins that can be retracted by pushing the button 86. Releasing the button 86 engages the pins in the cutouts 90 and locks the position of the stabilizing feet 74.

FIGS. 12A-12B show the collapsible storage rack 70 before and after deployment of stabilizing feet 74, and also illustrate an alternative guitar stand mounting bracket 92. FIG. 13 shows the bracket 92 having a base 94 and three upwardly extending walls 96 that stabilize the base member of the corresponding guitar stand. A pair of flexible fingers 98 project upward from the base 94 and provide an easy attachment means to lock in a guitar stand by simply pushing it downward onto the bracket 92.

Figure 14A:
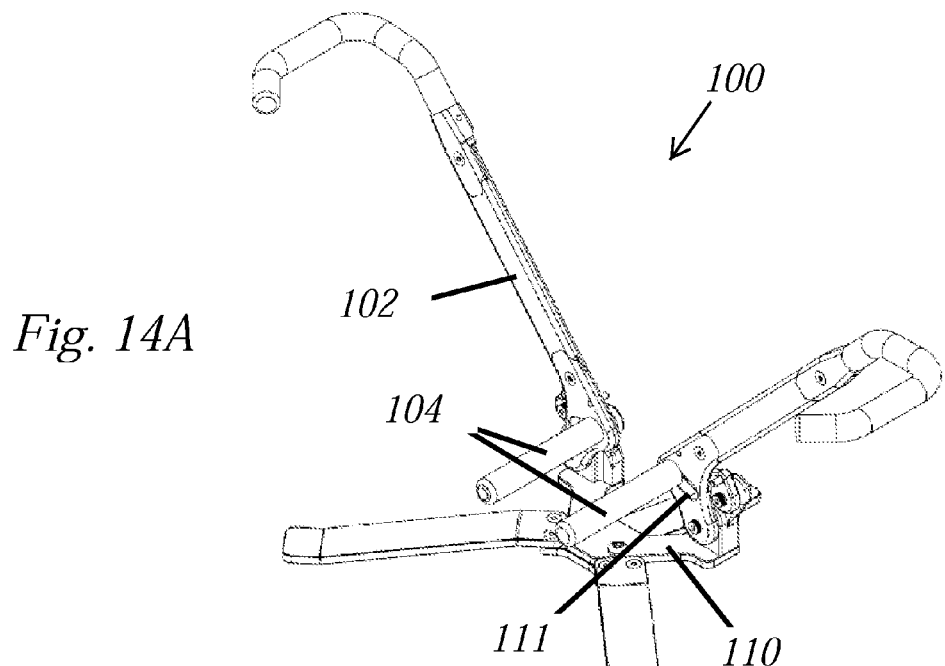

FIGS. 14A-14B illustrate an alternative guitar stand 100 of the present application that works in much the same way as the guitar stand 20 described above, but includes two guitar support members 102 rather than one. The support members 102 are straight tubular rods. As in the first embodiment, lower ends of cradling arms 104 pivot about shafts 106 that are fastened to upstanding housings 108 mounted to a base member 110. The base member 110 and housings 108 provide a fixed frame of reference for the moving parts of the stand 100.

The lower ends of the cradling arms 104 further include generally horizontal slots 111 through which the separate support members 102 pass. Rear ends of the support members 102 fasten to a common yoke 112. The yoke 112 extends outward from its points of connection with the support members 102 and has fastened thereto a pair of downwardly projecting guide shafts 114. The guide shafts 114 slide within cylindrical cavities formed in the upstanding housings 108, and are biased upward by springs 116. Both support members 102 are thus constrained by their connection with the yoke 112 and guide shafts 114 to vertical displacement. By virtue of the horizontal slots 111, downward movement of the support members 102 from placing a guitar thereon causes the cradling arms 104 to pivot inward into contact with the guitar body, thus providing lateral support.

Figure 15A:
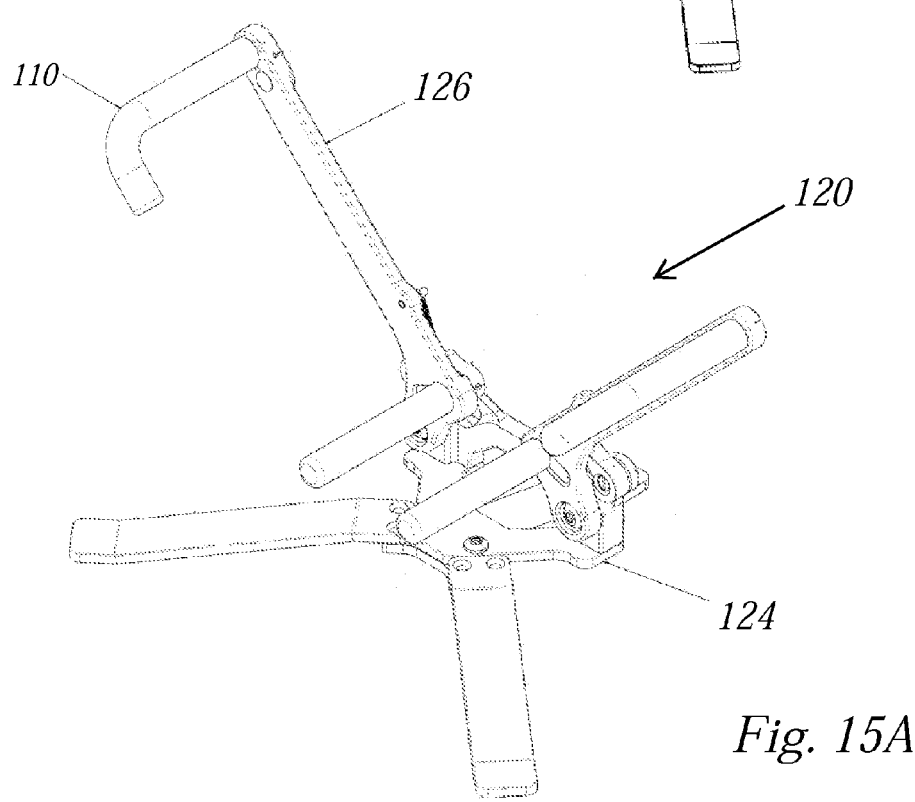

FIGS. 15A-15C are assembled and exploded perspective views of another alternative guitar stand 120 which is configure substantially the same as the stand 100 of FIGS. 14A-14B. FIG. 15B shows soft covers 122 made of neoprene or other such foam material that surrounds cradles 124 on the upper end of cradling arms 126.

FIGS. 16A-16B and 17A-17B are cutaway rear elevational views of the alternative guitar stand 120 illustrating an exemplary mechanism for coupling the movement of the two cradling arms 126. More particularly, when a guitar is placed on the separate support members 128, they are displaced downward. Movement of the support members 128 cams the cradling arms 126 inward by virtue of contact with the generally horizontal slots 130, as seen in FIG. 17B. Removal of the guitar permits the springs described above with respect to FIG. 14B to push the support members 128 upward, thus returning the cradling arms 126 to their open position, as seen in FIG. 16B.

Figure 19A:
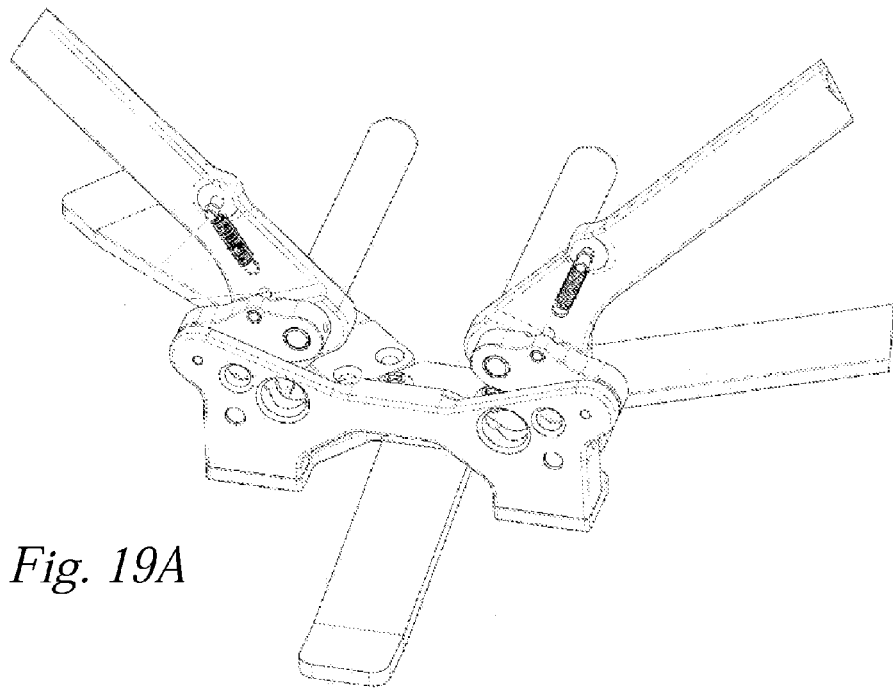
FIGS. 19A-19B are exploded perspective views of the central region of the alternative guitar stand of FIGS. 14A-14B illustrating how an upper assembly detachably mounts to stabilizing feet.
Figure 19B:
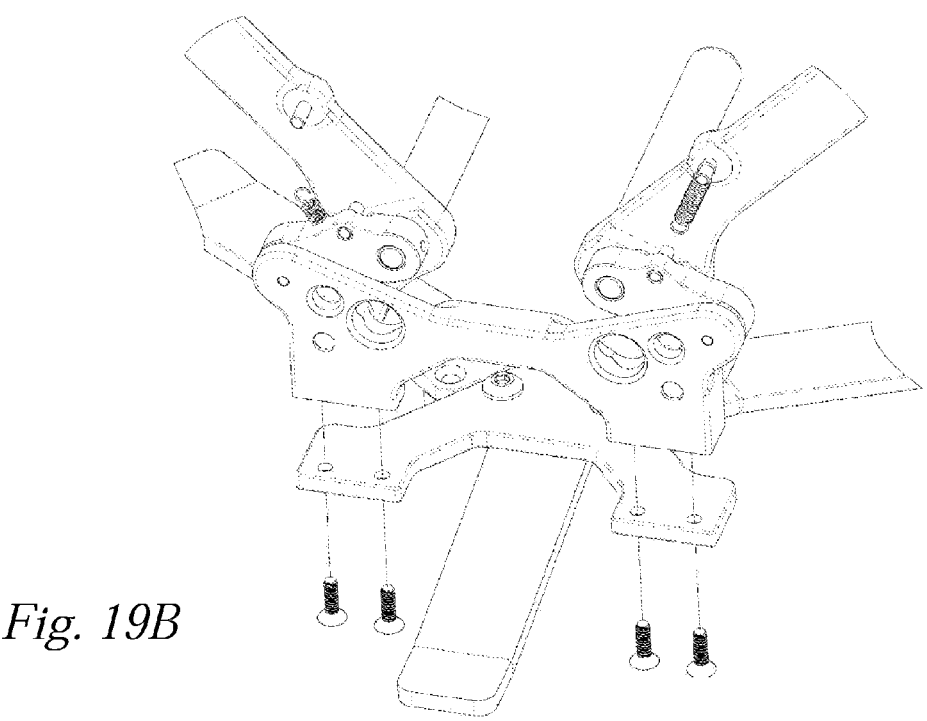

FIGS. 18A-18B are exploded perspective views of portions of the alternative guitar stand of FIGS. 14A-14B. FIGS. 19A-19B are exploded perspective views of the central region of the alternative guitar stand of FIGS. 14A-14B illustrating how it detachably mounts to stabilizing feet.

Figure 20:
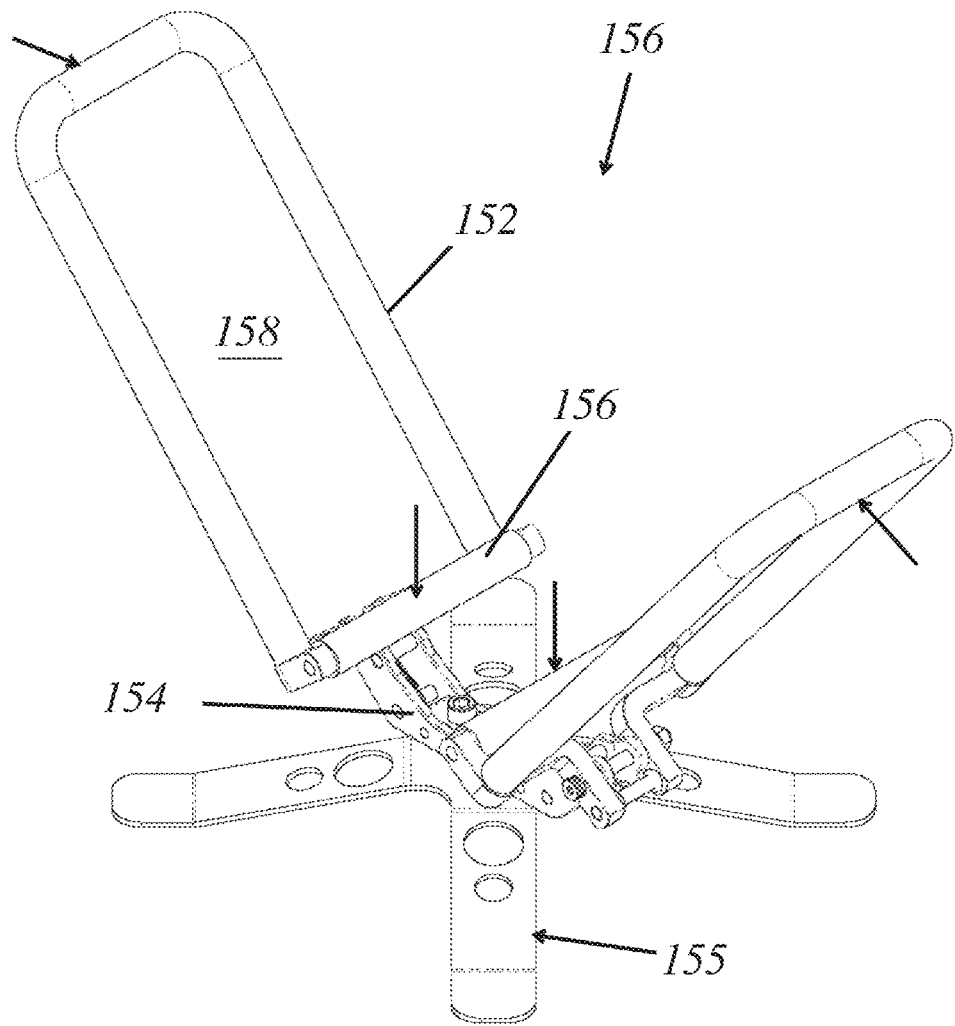
FIGS. 20 and 21 are perspective views of still further alternative guitar stands that can be mounted on the collapsible storage racks disclosed herein.
Figure 21:
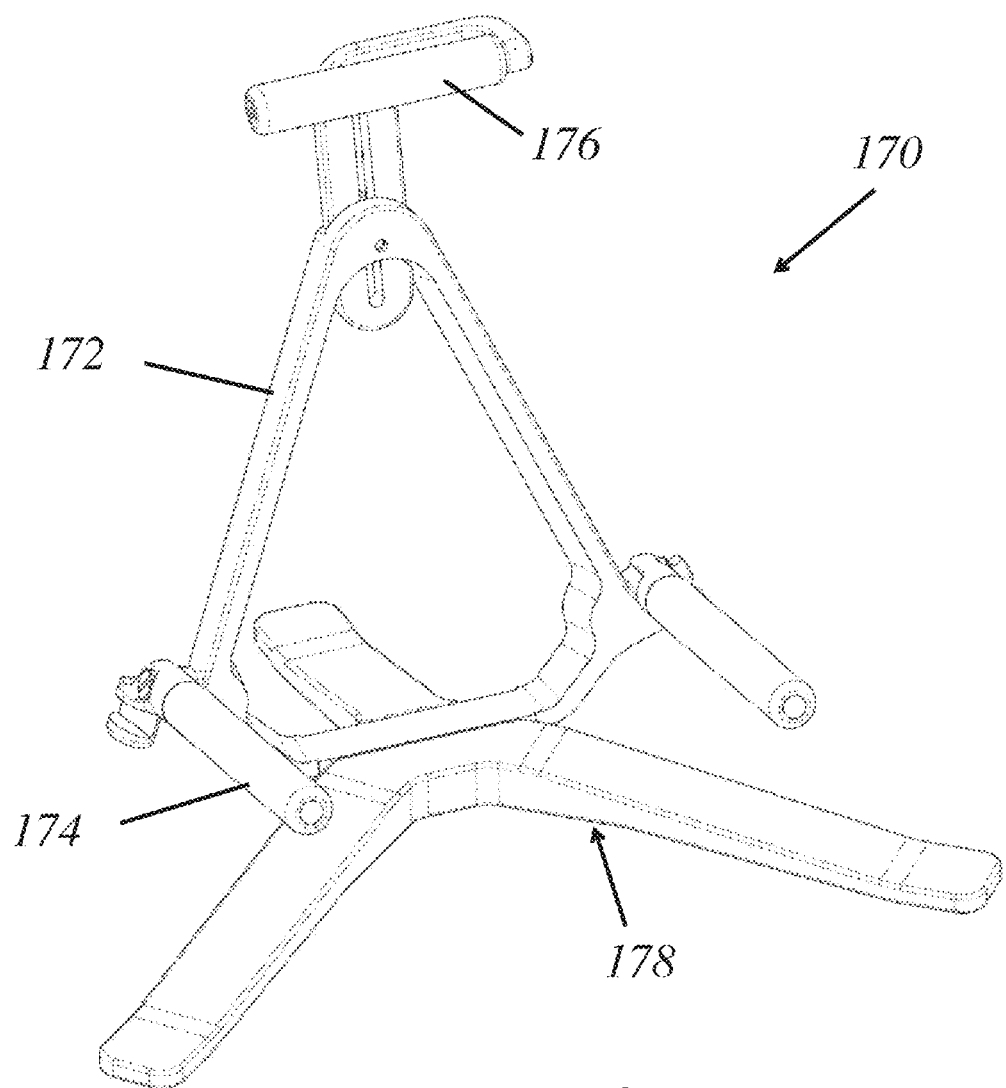

FIGS. 20 and 21 are perspective views of still further alternative guitar stands that can be mounted on the collapsible storage racks disclosed herein. FIG. 20 shows a guitar stand 150 that has a pair of cradling arms 152 that are mounted for pivotal motion about a base member 154. The base member 154 mounts on stabilizing platform 155 having for outwardly splayed feet. A lower end of each of the cradling arms 152 has a lever bar 156 on which the guitar presses downward, thus pivoting the upper ends of the arms inward as indicated by the movement arrows. The arms 152 each include spars in a generally rectangular configuration defining a large opening 158 wide enough to fit at least the lower fatter portion of the guitar body. This stand does not coordinate movement of the two arms 152, but is illustrated as another example of the stand that can be mounted on the collapsible storage racks disclosed herein.

FIG. 21 is a still further guitar stand 170 with no moving parts. The stand includes a generally triangular base member 172 having a pair of guitar support members 174 projecting horizontally therefrom on either side. A cradle 176 mounts to the top of the base member 172. The base member 172 mounts to stabilizing platform 178 having three outwardly splayed. A guitar is simply placed on the two support members 174 with the body or neck inside the cradle 176 which opens on one side. Again, this guitar stand is not as secure as the embodiments described above with coordinated movement of cradling arms, but is illustrated as another example of a simple stand which can be mounted on any of the storage racks disclosed.

FIGS. 22-27 depict a still further exemplary guitar stand 200 having an alternative mechanism for coupling the movement of two cradling arms 202. FIGS. 22A and 22B show the rear side of the guitar stand 200 which includes a yoke-shaped base member 204 on which the cradling arms 202 pivot, and a lower stabilizing platform 206. As before, the base member 204 is detachably mounted on the stabilizing platform 206 to form a stable support to hold a single guitar upright, but also may be detached from the stabilizing platform and secured to an adapter on a multiple guitar storage rack, such as the multi-stand collapsible storage rack 70 shown in FIGS. 12A-12B.

Figure 23:
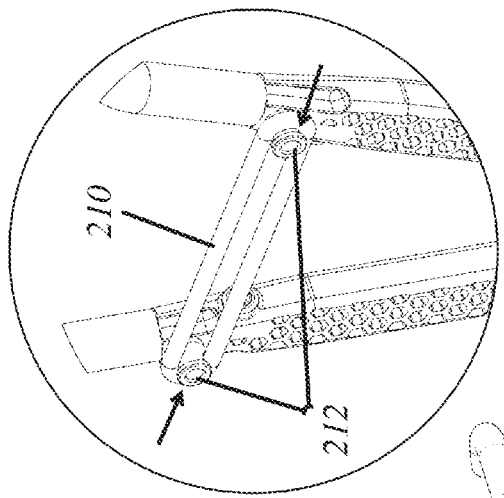
FIG. 23 is an enlarged view of the elastic member.
Figure 22B:
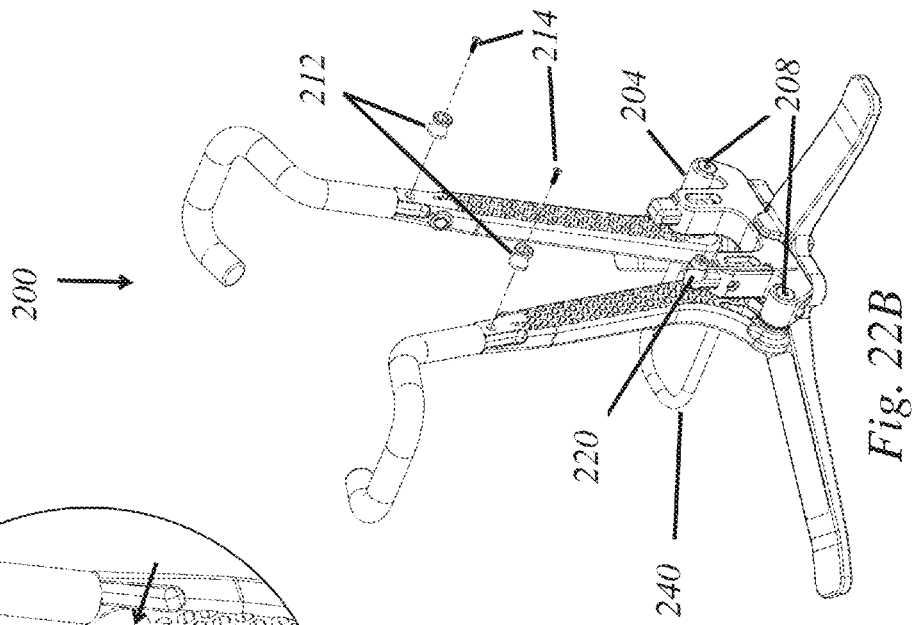
FIGS. 22A and 22B are perspective assembled and partially exploded views of the rear side of a still further guitar stand which includes an elastic member strung between two cradling arms to help retain a guitar held within the stand.
Figure 22A:
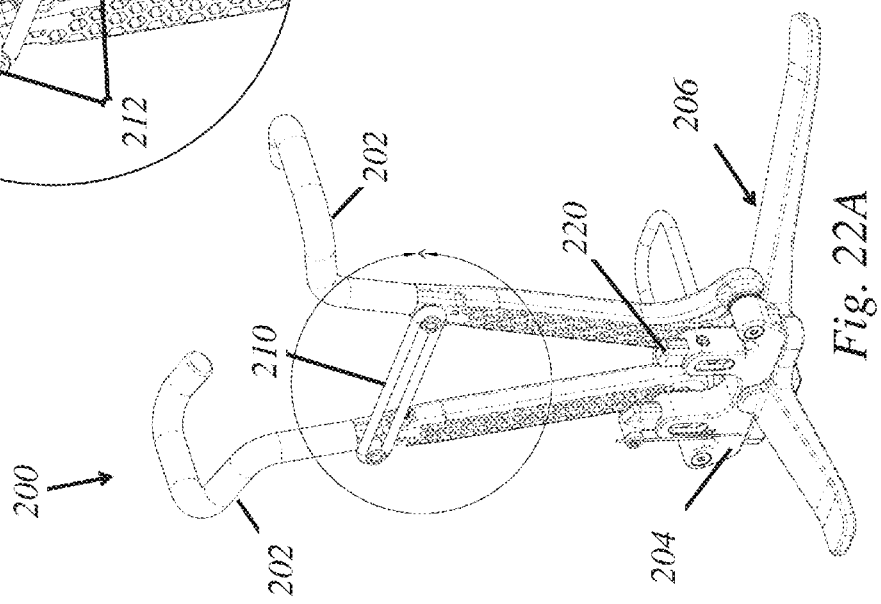

In a similar manner as described above, the cradling arms 202 separately pivot about lateral points 208 on the base member 204 between open and closed positions. FIG. 22A shows the arms 202 in the closed position, and an elastic member 210 strung between the arms to help retain a guitar held therebetween. FIG. 23 is an enlarged view of the elastic member 210, which in the illustrated embodiment comprises a thick rubber loop or band. Opposite ends of the elastic member 210 loop around small posts 212 having a concave middle portion to prevent the elastic member from slipping off. The posts 212 are shown exploded from the cradling arms 202 in FIG. 22B and are secured thereto with screws 214, for example. Securing the elastic member 210 between the cradling arms 202 provides a biasing force to urge the arms toward each other. The elastic member 210 may be secured in this manner after a guitar is in place in the stand 200 to help preventing the guitar from being jostled out.

Figure 24A:
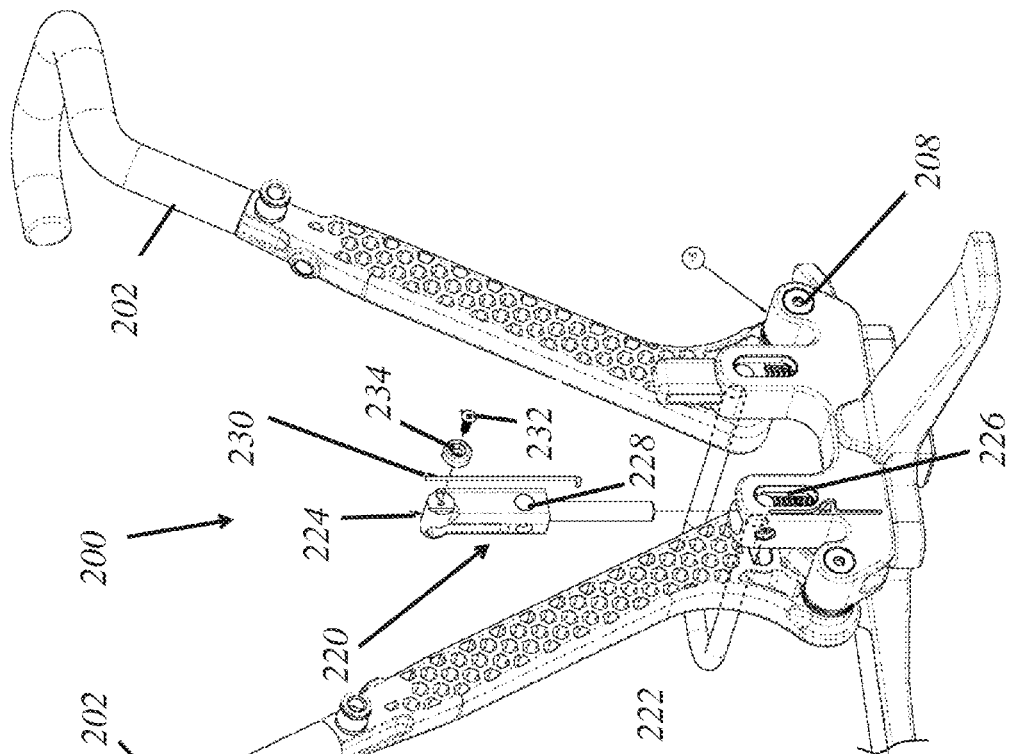
Figure 24B:
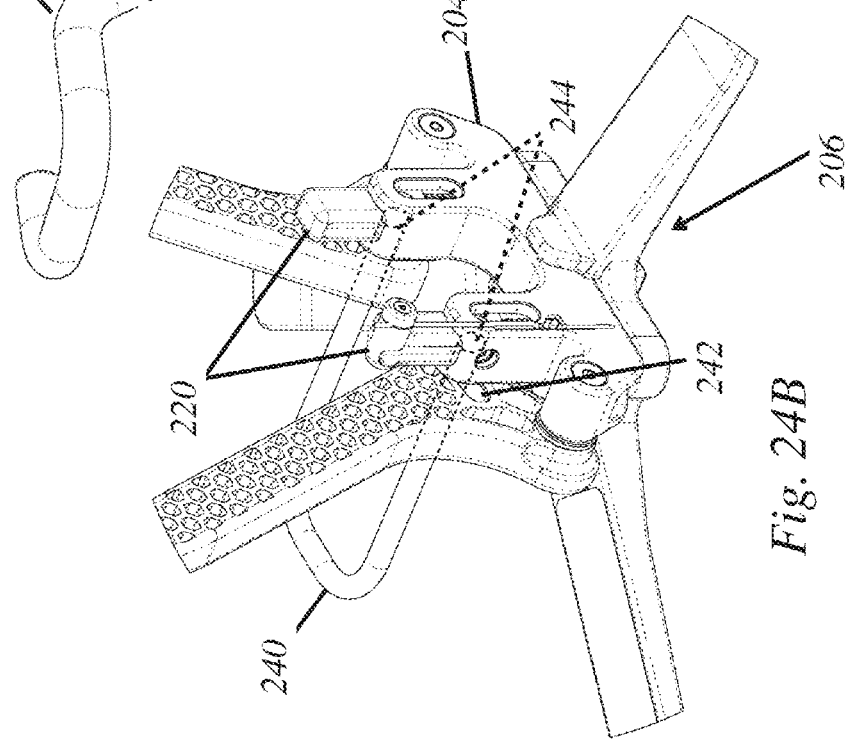

FIGS. 24A-24C and 25 better illustrate components of an alternative mechanism for coupling the movement of the two cradling arms 202. In particular, FIG. 24A shows one of a pair of downwardly projecting guide shafts 220 exploded above the base member 204. Each of the guide shafts 220 include a lower pin 222 that extends within a vertical channel (not shown) provided in the base member 204. An enlarged upper portion 224 slides within a vertical cavity 226 in the base member 204 and includes a horizontal throughbore 228, whose purpose will be explained below. In at least one of the guide shafts 220, shown exploded in FIG. 24A, an elongated guide pin 230 is fastened to the top of the upper portion 224 with a fastener 232 and washer 234, and projects downward generally parallel therewith. A lower end of the guide pin 230 bends horizontally back toward the guide shaft 220 to form a finger of about 90° (not shown).

In a similar manner as explained above, the guitar stand 200 has a U-shaped support member 240 on which the body of a guitar rests and which moves vertically with respect to the base of the stand. In particular, the two legs of the support member 240 project in a rearward direction through generally horizontal cam slots 242 (FIG. 24B) at lower ends of the cradling arms 202 and engage the vertically movable guide shafts 220. More particularly, the terminal ends 244 of the legs of the support member 240 are secured within the horizontal throughbores 228 in the guide shafts 220, the vertical cavities 226 of the base member 204 being open to the front side (and also to the rear, as shown). In this manner, vertical movement of the support member 240, such as when a guitar is placed thereon, causes corresponding vertical movement of the guide shafts 220. Although not shown, a spring is desirably provided around each of the lower pins 222 to bias the guide shafts 220 upward, and thus bias the support member 240 upward. As has been explained previously, downward movement of the support member 240 causes inward pivoting of the cradling arms 202 by virtue of forces acting on the horizontal cam slots 242. The elongated guide pin 230 provides controlled movement of the guide shafts 220, and thus of the cradling arms 202, as will be explained.

FIG. 26 is an elevational view of the base member 204 used in the mechanism for coupling the movement of the two cradling arms, and FIG. 27 is a detail thereof. The base member 204 includes a central body 250 from which two laterally-extending flanges 252 extend and angle upward to the cradling arm pivot points 208. The vertical cavities 226 that receive the guide shafts 220 are formed within upstanding posts 254 spaced apart across a bridge 256. A locking groove 260 is formed on a rear face of the base member 204 extending from the central body 250 and up one of the upstanding posts 254. The bent end of the elongated guide pin 230 tracks within the locking groove 260 to provide some control over pivoting of the cradling arms 202 as will be explained.

With reference to FIGS. 27 and 27A, the locking groove 260 include an elongated vertical section 270 with which a downwardly angled bypass section 272 and a short horizontal return section 274 intersect. The bent end of the guide pin 230 resides initially at position A along the upper part of the vertical section 270. When the guitar is placed on the stand 200, the support member 240 carries the guide shafts 220 and pin 230 downward, and a diversion 276 routes the bent end of the guide pin 230 into the bypass section 272. As seen in FIG. 27A, a small tooth in the floor of the bypass section 272 permits downward passage of the bent end of the guide pin 230 to position B, but has a step that prevents it from rising upward. The pin 230 thus holds the one guide shaft 220 down and thus, along with the weight of the guitar, helps to hold the cradling arms 202 closed. When the user desires to release the guitar, he/she pushes down on it to move the bent end of the guide pin 230 out of the bypass section 272 to the horizontal return section 274, and the spring force of the pin 230 causes it to snap to position C.

The illustrated locking mechanism essentially works by pushing to engage lock and pushing to unlock. The guide pin 230, which is vertically adjustable and formed of spring wire, follows a specific groove along the rear of the base member 204. The groove runs along an initial ramp and then drops into its locking position (position A to position B). To unlock the guitar push down, this will them allow the spring wire to snap back to its initial position (position B to position C) thus allowing the wire to be brought up to its open position (position A) acting like an infinite loop. Position D is an option for when customers want the arms closed they can position them together and magnetic fixtures will hold the arms 202 in place, which is desirable for guitar players who travel and don't want the arms open all the time. This arrangement represents a number of similar contemplated locking mechanisms which may be utilized, such as guide pins 230 on both guide shafts 220 or a more robust configuration.

Materials: In a preferred embodiment, the cradling arms 30 and cradles 32 are made from a self-lubricating Delrin plastic. The single tripod stabilizing platform 40 and multi-stand rack 70 are made from rigid Polycarbonate plastic. The guide pins which slide inside cradling arms 30 are made from mild steel then treated with a black chrome finish for added protection and smoothness. The several base members (e.g., 34) and guitar support members are made from 6061 aluminum, and the support foam is Nitrile rubber. All hardware on the single and multi-stand racks are specified as stainless steel to avoid corrosion when used in outdoor environments. For the multi-stand rack 70, the extruded rail is made from 6061 aluminum as well as the end brackets, and legs. As previously mentioned all hardware fasteners for this stand are specified as stainless steel.

While the invention has been described in its preferred embodiments, it is to be understood that the words which have been used are words of description and not of limitation. Therefore, changes may be made within the appended claims without departing from the true scope of the invention.

What is claimed is:

1. A stand for securing a stringed musical instrument having a lower body and an upstanding neck, comprising:
   a base member;
   a pair of cradling arms mounted to the base member in a manner that allows pivoting movement generally in a vertical plane relative to the base member, the cradling arms extending upward from the base member and angling outward from one another in an open position, the cradling arms each having a cradle that extends horizontally forward therefrom a distance at least as great as a width of the body of the stringed musical instrument, the cradling arms being able to pivot inward toward each other and toward a closed position where the cradles contact the body of the stringed musical instrument and provide lateral support on either side thereof, wherein the cradling arms broaden at their lower ends and each has an outer finger provided with a horizontal through-bore that receives a pivot shaft, and wherein the pivot shafts extend horizontally rearward from the cradling arms and are journalled for pivoting motion about an outer flange on the base member; and
   a lower support member for the stringed musical instrument that mounts to and extends horizontally forward from the base member and on which the stringed musical instrument rests, the support member being adapted to move vertically relative to the base member, the support member being coupled to both of the cradling arms and configured to cause the cradling arms to pivot from the open toward the closed position when the body of the stringed musical instrument is placed on the support member and displaces it downward, wherein the support member is U-shaped with a closed end projecting forward and two free ends to the rear, and wherein the two free ends of the support member extend through cam slots in respective cradling arms and engage guide shafts mounted within the base member for vertical movement.

2. The stand of claim 1, further comprising a stabilizing platform to which the base member mounts having a plurality of outwardly splayed feet, wherein mounting the base member on the stabilizing platform provides an autonomous support stand for a single stringed musical instrument.

3. The stand of claim 2, further comprising an elongated storage rack and a plurality of mounting adapters that can be fastened thereto at various locations, each mounting adapter having structure to which the base member of the stand mounts when the stabilizing platform is detached from the base member, wherein a plurality of the stands may be mounted to corresponding mounting adapters and arrayed in sequence along the storage rack.

4. The stand of claim 1, further including a locking mechanism coupled to the support member which engages the base member when the cradling arms are moved into the closed position to retain the cradling arms in the closed position.

5. The stand of claim 4, wherein the locking mechanism engages by lowering the stringed musical instrument onto the support member and disengages by pushing the stringed musical instrument further down to further lower the support member.

6. The stand of claim 1, wherein the guide shafts are spring-biased upward.

7. The stand of claim 1, wherein at least one of the guide shafts has a guide pin mounted thereto which engages the base member when the cradling arms are moved into the closed position to retain the cradling arms in the closed position.

8. The stand of claim 1, wherein the cradling arms each having a cradle that extends outward from the arm, horizontally forward, and then inward to provide a concave receiving area facing the concave receiving area of the other cradle, wherein the concave receiving areas of the cradles contact the body of the stringed musical instrument and provide lateral support on either side thereof when the cradling arms pivot inward toward each other.

9. A stand for securing a stringed musical instrument having a lower body and an upstanding neck, comprising:
 a base member;
 a lower support member for the stringed musical instrument that mounts to and extends horizontally forward from the base member and on which the stringed musical instrument rests, the lower support member having sufficient strength to support the stringed musical instrument thereon, the support member being adapted to move vertically relative to the base member; and
 a pair of cradling arms mounted to extend upward from the base member and angle outward from one another in an open position and being able to pivot inward in a vertical plane relative to the base member toward each other and toward a closed position, the support member being mechanically coupled to at least a first cradling arm to cause the first cradling arm to pivot from the open toward the closed position when the body of the stringed musical instrument is placed on the support member and displaces it downward, the cradling arms each having a padded cradle that extends horizontally forward therefrom, wherein the cradles are positioned at a height so as to contact the body of the stringed musical instrument and provide lateral support on either side thereof when the stringed musical instrument is placed on the support member, and wherein the first cradling arm is biased toward the open position such that raising the stringed musical instrument from the support member permits the first cradling arm to move toward the open position, thus releasing the stringed musical instrument from between the cradles, wherein the support member is mechanically coupled to both cradling arms to cause them to pivot from the open toward the closed position when the body of the stringed musical instrument is placed on the support member and displaces it downward, and both cradling arms are biased toward the open position such that raising the stringed musical instrument from the support member permits the cradling arms to move toward the open position, thus releasing the stringed musical instrument from between the cradles, and wherein the support member comprises two shafts that pass through cam slots in respective cradling arms and extend into a vertical slot defined by the base member, wherein vertical movement of the support member in the vertical slots cams the cradling arms to pivot in and out.

10. The stand of claim 9, further including a locking mechanism coupled to the support member which engages the base member when the cradling arms are moved into the closed position to retain the cradling arms in the closed position.

11. The stand of claim 10, wherein the locking mechanism engages by lowering the stringed musical instrument onto the support member and disengages by pushing the stringed musical instrument further down to further lower the support member.

12. The stand of claim 9, further comprising a stabilizing platform to which the base member mounts having a plurality of outwardly splayed feet, wherein mounting the base member on the stabilizing platform provides an autonomous support stand for a single stringed musical instrument.

13. The stand of claim 12, further comprising an elongated storage rack and a plurality of mounting adapters that can be fastened thereto at various locations, each mounting adapter having structure to which the base member of the stand mounts when the stabilizing platform is detached from the base member, wherein a plurality of the stands may be mounted to corresponding mounting adapters and arrayed in sequence along the storage rack.

14. The stand of claim 9, wherein the cradling arms each having a cradle that extends outward from the arm, horizontally forward, and then inward to provide a concave receiving area facing the concave receiving area of the other cradle, wherein the concave receiving areas of the cradles contact the body of the stringed musical instrument and provide lateral support on either side thereof when the cradling arms pivot inward toward each other.

15. A stand for securing a stringed musical instrument having a lower body and an upstanding neck, comprising:
 a base member;
 a pair of cradling arms mounted to the base member in a manner that allows pivoting movement generally in a vertical plane relative to the base member, the cradling arms extending upward from the base member and angling outward from one another in an open position, the cradling arms each having a cradle that extends horizontally forward therefrom, the cradling arms being able to pivot inward toward each other and toward a closed position where the cradles contact the body of the stringed musical instrument and provide lateral support on either side thereof; and
 a lower support member for the stringed musical instrument that mounts to and extends horizontally forward from the base member and on which the stringed musical instrument rests, wherein the support member comprises two shafts that pass through cam slots in respective cradling arms and extend into a vertical slot defined by the base member, wherein vertical movement of the support member in the vertical slots cams the cradling arms to pivot in and out, and placement of the body of the stringed musical instrument on the support member displaces it downward and causes the cradling arms to pivot from the open toward the closed position, wherein the support member is U-shaped with a closed end projecting forward and the two shafts to the rear, and wherein the two shafts of the support member extend through the cam slots in respective cradling arms and engage guide shafts mounted within the vertical slots of the base member for vertical movement.

16. The stand of claim 15, wherein both cradling arms are biased toward the open position such that raising the stringed musical instrument from the support member permits the cradling arms to move toward the open position, thus releasing the stringed musical instrument from between the cradles.

17. The stand of claim 15, further including a locking mechanism coupled to the support member which engages the base member when the cradling arms are moved into the closed position to retain the cradling arms in the closed position.

18. The stand of claim 15, wherein the guide shafts are spring-biased upward.

19. The stand of claim 15, wherein the cradling arms each having a cradle that extends outward from the arm, horizontally forward, and then inward to provide a concave receiving area facing the concave receiving area of the other cradle, wherein the concave receiving areas of the cradles contact the body of the stringed musical instrument and provide lateral support on either side thereof when the cradling arms pivot inward toward each other.

20. The stand of claim 15, further comprising an elongated storage rack and a plurality of mounting adapters that can be fastened thereto at various locations, each mounting adapter having structure to which the base member of the stand mounts, wherein a plurality of the stands may be mounted to corresponding mounting adapters and arrayed in sequence along the storage rack.

* * * * *